US012663245B2

(12) United States Patent (10) Patent No.: US 12,663,245 B2
Asa et al. (45) Date of Patent: Jun. 23, 2026

(54) HEAT RESISTANT STRUCTURE OF FLYING BODY AND MANUFACTURING METHOD OF HEAT RESISTANT STRUCTURE OF FLYING BODY

(71) Applicant: MITSUBISHI HEAVY INDUSTRIES, LTD., Tokyo (JP)

(72) Inventors: Chisato Asa, Tokyo (JP); Kosuke Nishikawa, Tokyo (JP); Tomoaki Usuki, Tokyo (JP); Takashi Otowa, Tokyo (JP); Takahiro Miyamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 825 days.

(21) Appl. No.: 17/970,926

(22) Filed: Oct. 21, 2022

(65) Prior Publication Data

US 2023/0152070 A1 May 18, 2023

(30) Foreign Application Priority Data

Nov. 17, 2021 (JP) .................................. 2021-186997

(51) Int. Cl.
F42B 12/74 (2006.01)
C04B 35/83 (2006.01)
(Continued)

(52) U.S. Cl.
CPC .............. F42B 12/74 (2013.01); C04B 35/83 (2013.01); C04B 41/4523 (2013.01); (Continued)

(58) Field of Classification Search
CPC .......... F42B 15/34; F42B 15/36; F42B 10/46; F42B 10/52; B64G 1/58; B64G 1/62
(Continued)

(56) References Cited

U.S. PATENT DOCUMENTS 5,340,058 A * 8/1994 Holl ........................ F42B 12/76
244/121
5,545,484 A * 8/1996 Yamaguchi ............. C04B 41/52
428/408
(Continued)

FOREIGN PATENT DOCUMENTS

CN 101708999 5/2010
JP 7-033098 2/1995
(Continued)

OTHER PUBLICATIONS

Reactor Grade Zirconium, Zirconium Allows, ATI, Feb. 3, 2015 https://www.atimaterials.com/Products/Documents/datasheets/zirconium/alloy/Zr_nuke_waste_disposal_v1.pdf (Year: 2015).*
(Continued)

*Primary Examiner* — Arfan Y. Sinaki
(74) *Attorney, Agent, or Firm* — Wenderoth, Lind & Ponack, L.L.P.

(57) ABSTRACT

A heat resistant structure is applied to a flying body having a tip part and a body part. The tip part is arranged in a front end of the flying body with respect to a direction of travel of the flying body. The body part is arranged behind the tip part with respect to the direction of travel. The tip part is provided with a surface member, a base part, and an insulation member. The surface member is arranged on an outer surface of the tip part and has a melting point higher than a maximal temperature reached on a surface of the flying body when the flying body moves in an atmosphere and is heated. The base part couples the surface member to the body part. The insulation member is arranged between the surface member and the base part, and thermally insulates the base part from the surface member.

9 Claims, 22 Drawing Sheets

1:Flying Body

20:Tip Part    10:Body Part

22:Insulation Member
24:Abutting Member    A
B    11:Surface Member
21:Surface Member    23:Base Part
200    13:Base Part
25:Coupling Member
B
A X:Direction of Travel

(51) Int. Cl.
    *C04B 41/45*          (2006.01)
    *C04B 41/51*          (2006.01)
    *C04B 41/88*          (2006.01)

(52) U.S. Cl.
    CPC ............ *C04B 41/515* (2013.01); *C04B 41/88*
        (2013.01); *C04B 2235/5248* (2013.01); *C04B*
        *2235/9607* (2013.01)

(58) Field of Classification Search
    USPC ....................................................... 244/171.7
    See application file for complete search history.

(56)              References Cited

U.S. PATENT DOCUMENTS

| | | | | |
|---|---|---|---|---|
| 6,663,051 | B2 * | 12/2003 | Okuyama | B64G 1/58 |
| | | | | 428/105 |
| 6,666,144 | B1 * | 12/2003 | Kim | F42B 15/36 |
| | | | | 102/374 |
| 9,647,330 | B1 * | 5/2017 | DiChiara | H01Q 1/42 |
| 9,835,425 | B2 * | 12/2017 | Rodriguez | F42B 10/46 |
| 10,543,663 | B2 * | 1/2020 | Heng | B32B 25/08 |
| 11,624,597 | B1 * | 4/2023 | Hollis | F42B 15/36 |
| | | | | 102/377 |
| 11,901,619 | B2 * | 2/2024 | Best | H01Q 1/281 |
| 2003/0025040 | A1 | 2/2003 | Okuyama | |
| 2007/0228211 | A1 * | 10/2007 | Facciano | F41G 7/2246 |
| | | | | 244/3.19 |
| 2010/0218376 | A1 | 9/2010 | Boissy | |
| 2012/0121892 | A1 * | 5/2012 | Fisch | F42B 15/34 |
| | | | | 427/372.2 |
| 2017/0117621 | A1 * | 4/2017 | DiChiara | F42B 10/46 |

FOREIGN PATENT DOCUMENTS

| | | |
|---|---|---|
| JP | 2000-151138 | 5/2000 |
| JP | 2003-048266 | 2/2003 |
| JP | 2003-112699 | 4/2003 |
| JP | 2010-202185 | 9/2010 |

OTHER PUBLICATIONS

Zeng et al., "Microstructure and ablation behavior of carbon/carbon composites infiltrated with Zr—Ti" Carbon, vol. 54, 2013, pp. 300-309.

* cited by examiner

F I G . 1
1:Flying Body
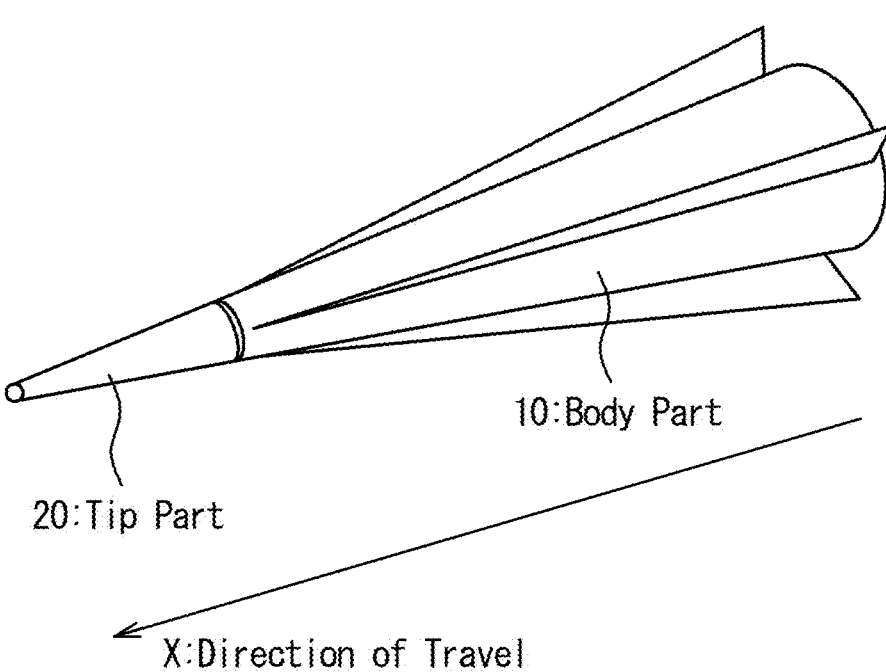
10:Body Part
20:Tip Part
X:Direction of Travel 1:Flying Body 20:Tip Part    10:Body Part 22:Insulation Member
24:Abutting Member
21:Surface Member
11:Surface Member
23:Base Part
13:Base Part
25:Coupling Member

200

X:Direction of Travel

F I G. 4A
<u>A-A</u>
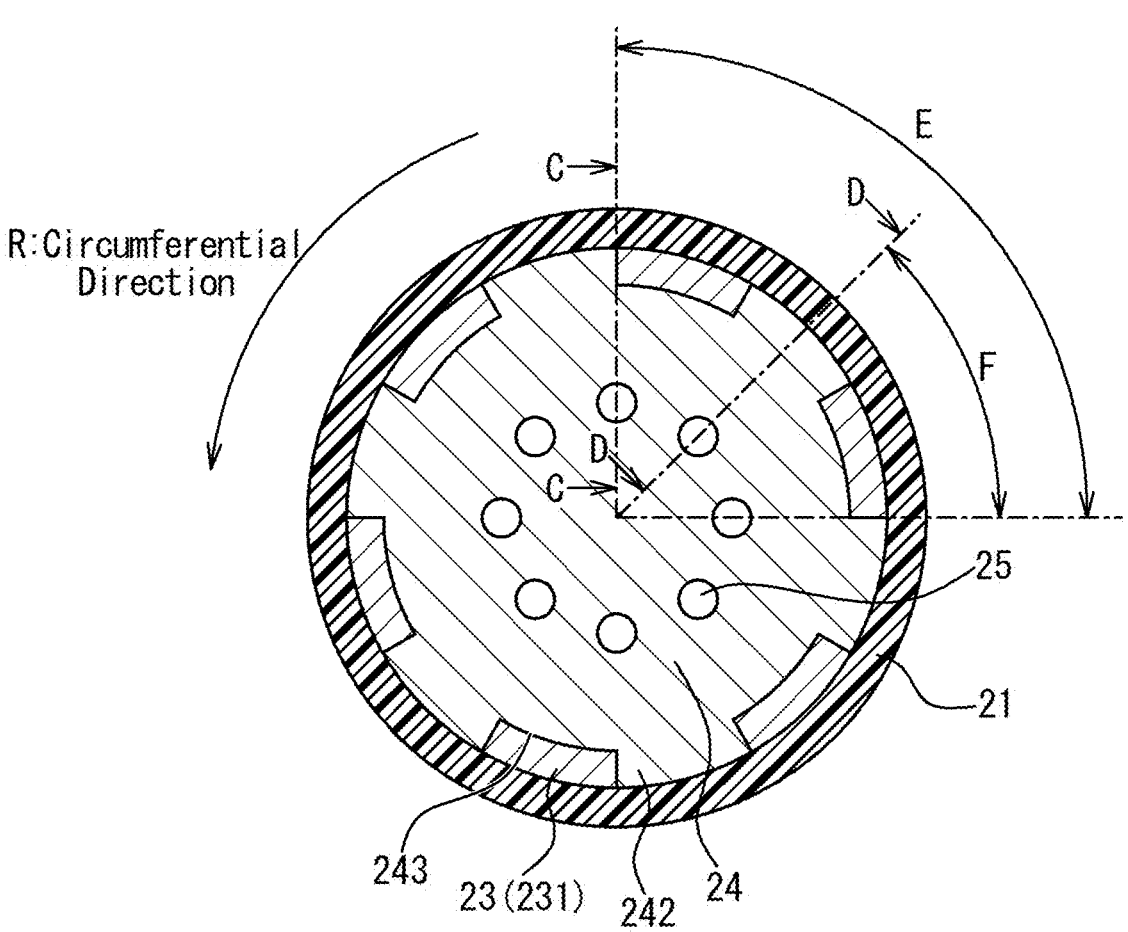

F I G . 4 B
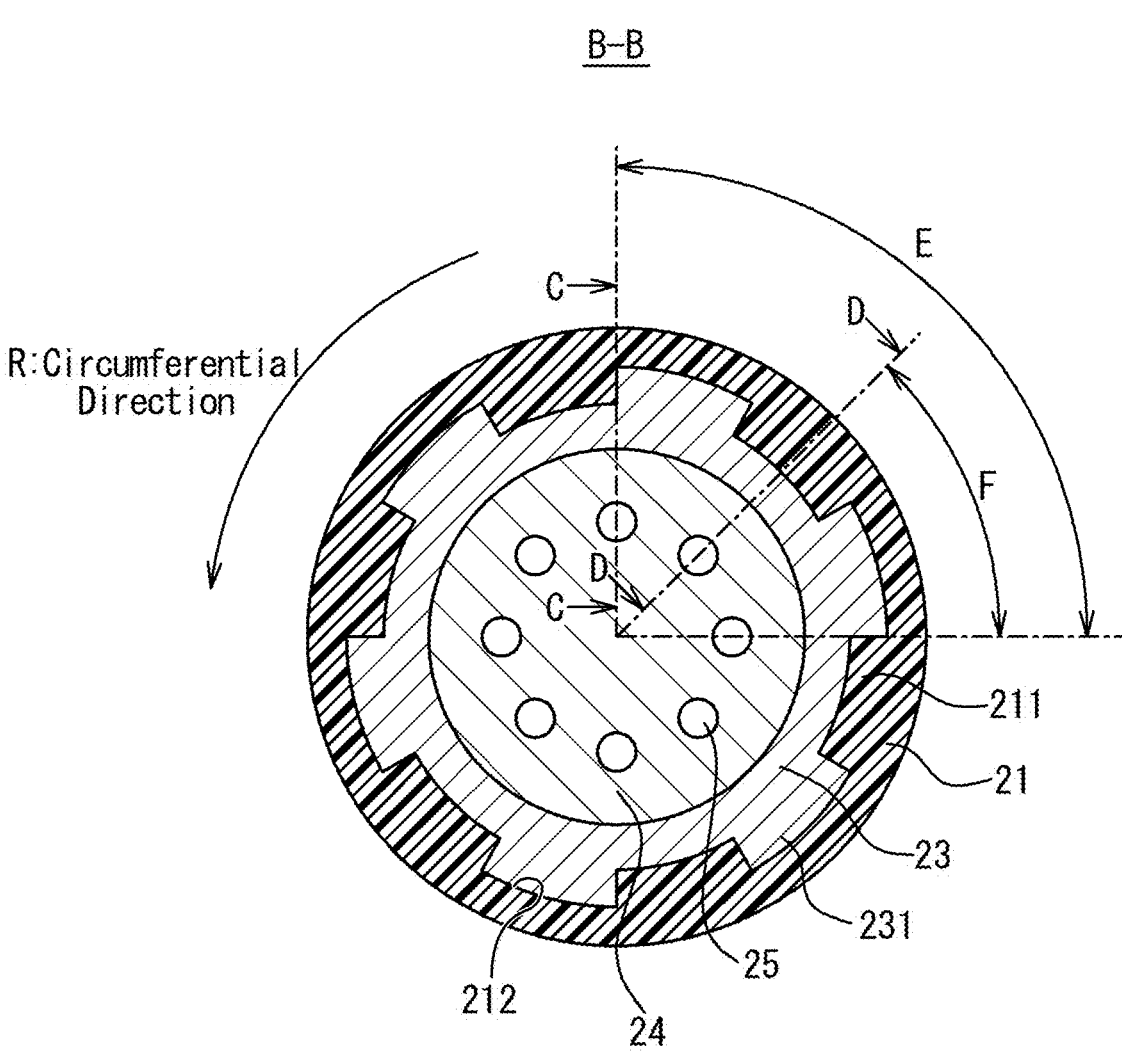

F I G . 4 C
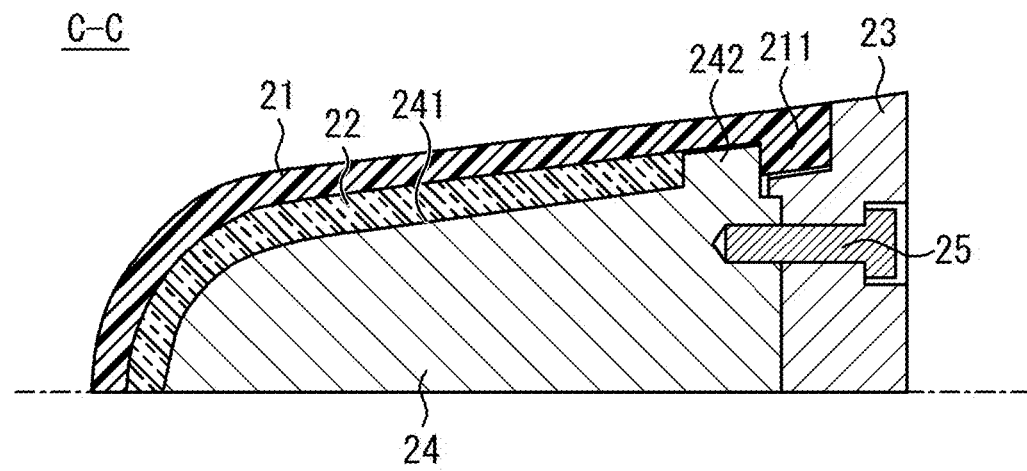
F I G . 4 D
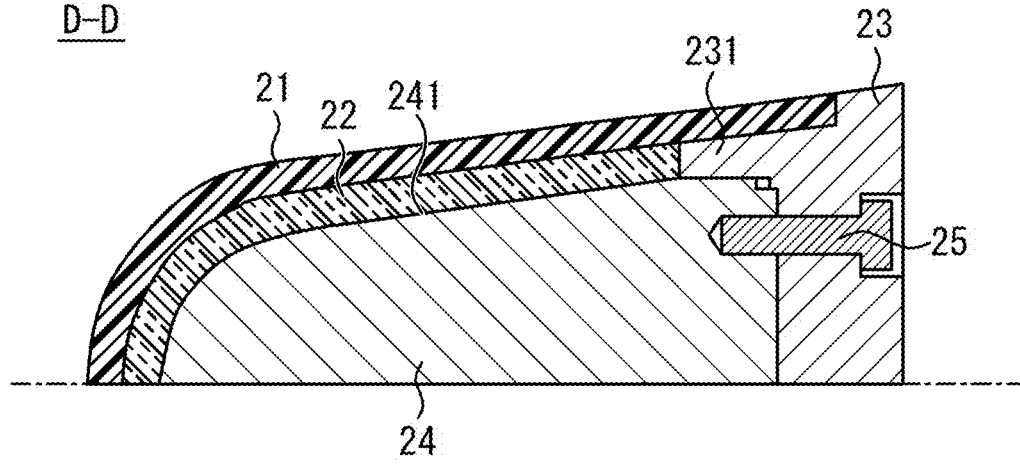

F I G . 4 E
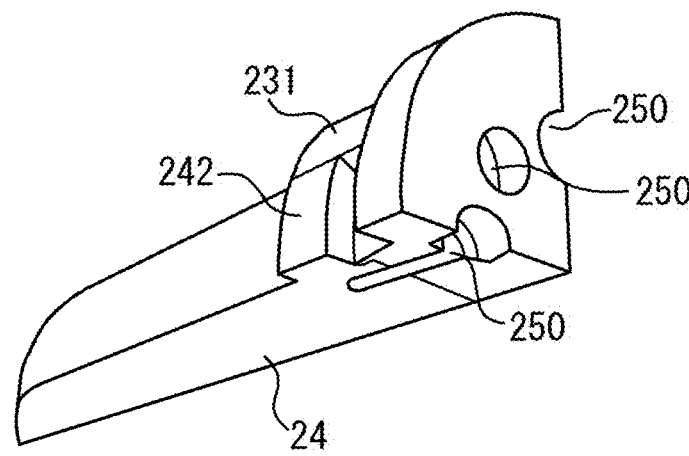
F I G . 4 F
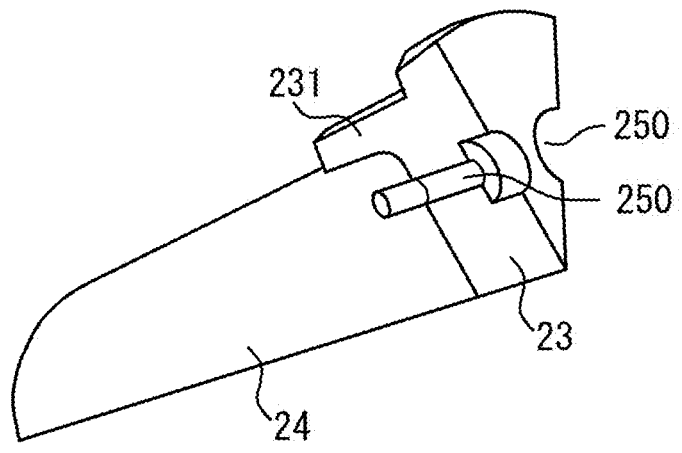

F I G . 6 A
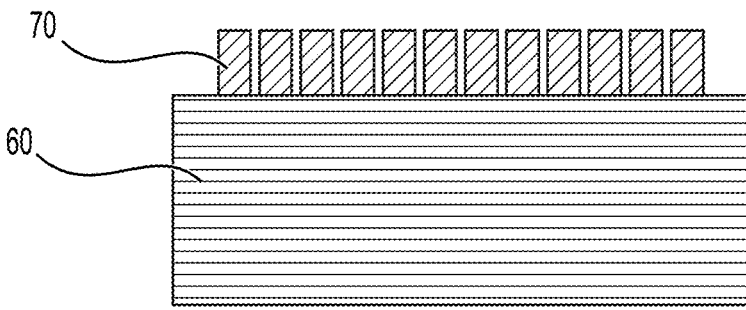
F I G . 6 B
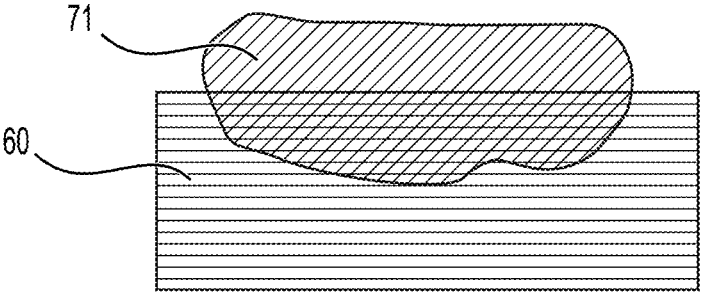
F I G . 6 C
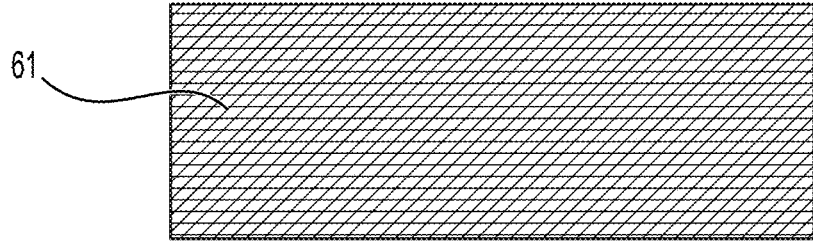

F I G . 7 A
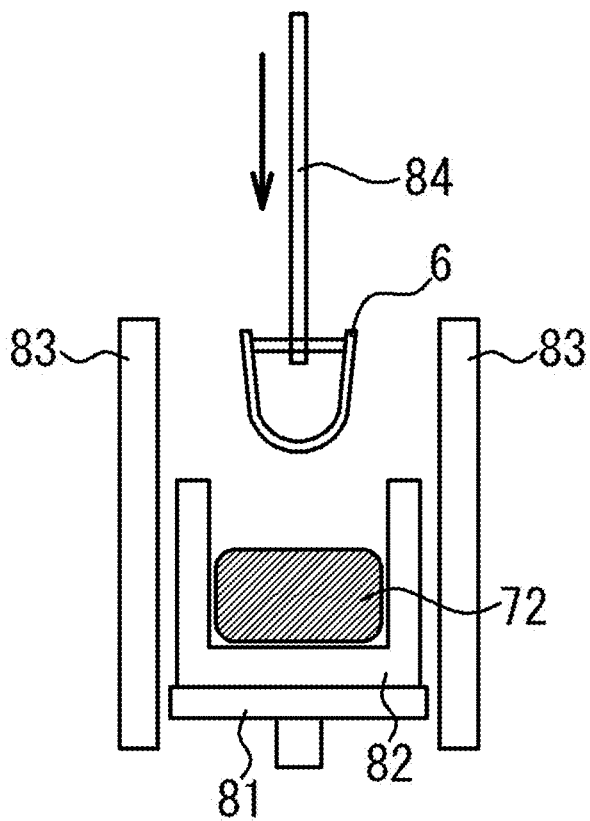
F I G . 7 B
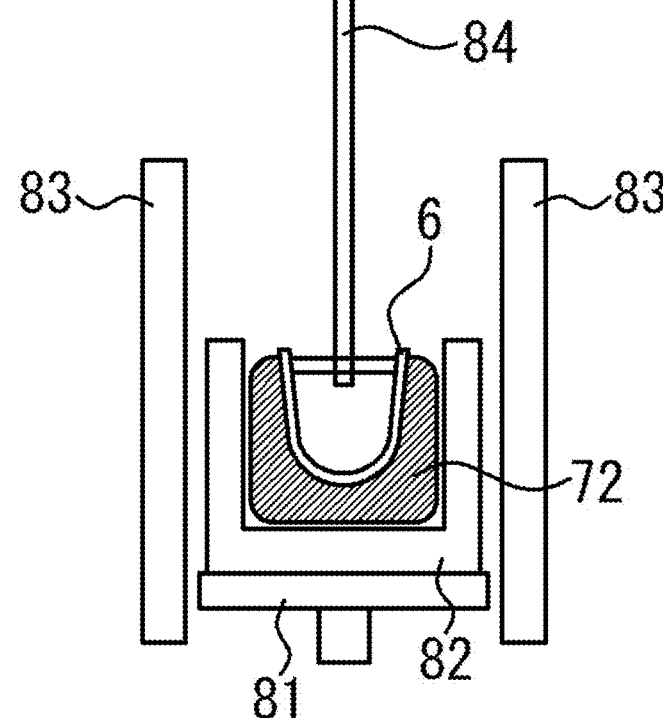

F I G . 1 0 A
<u>30:Tip Part</u>
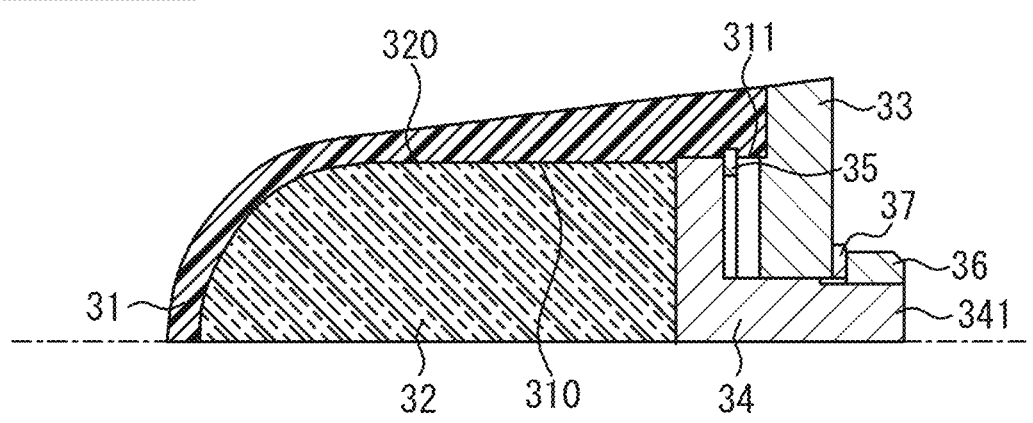
F I G . 1 0 B
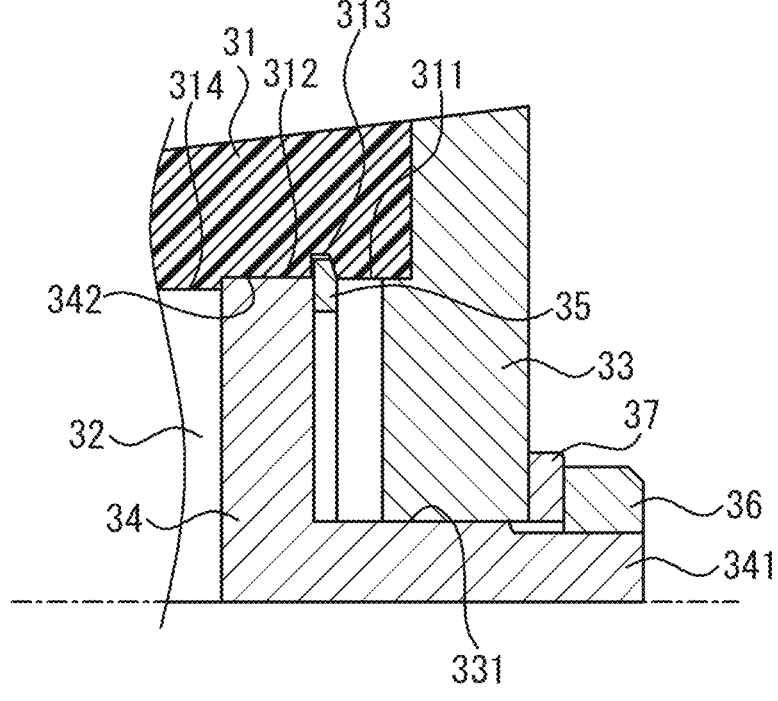

35

F I G . 1 3 A
H
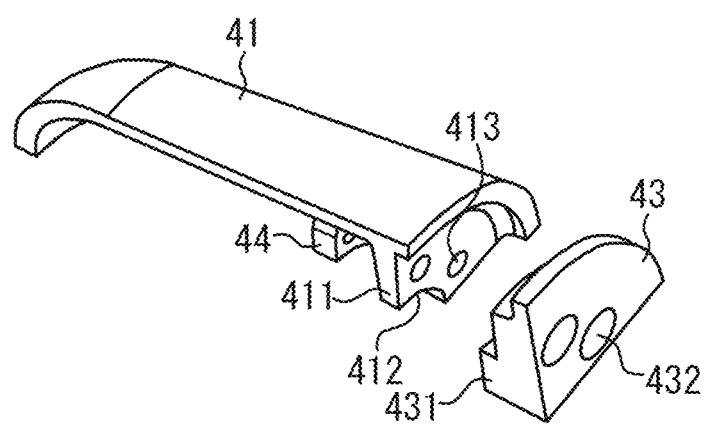
F I G . 1 3 B
H
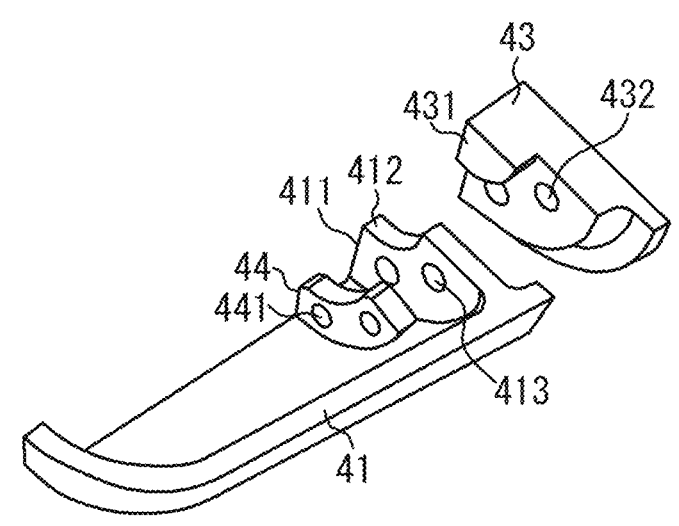

F I G .  1 5
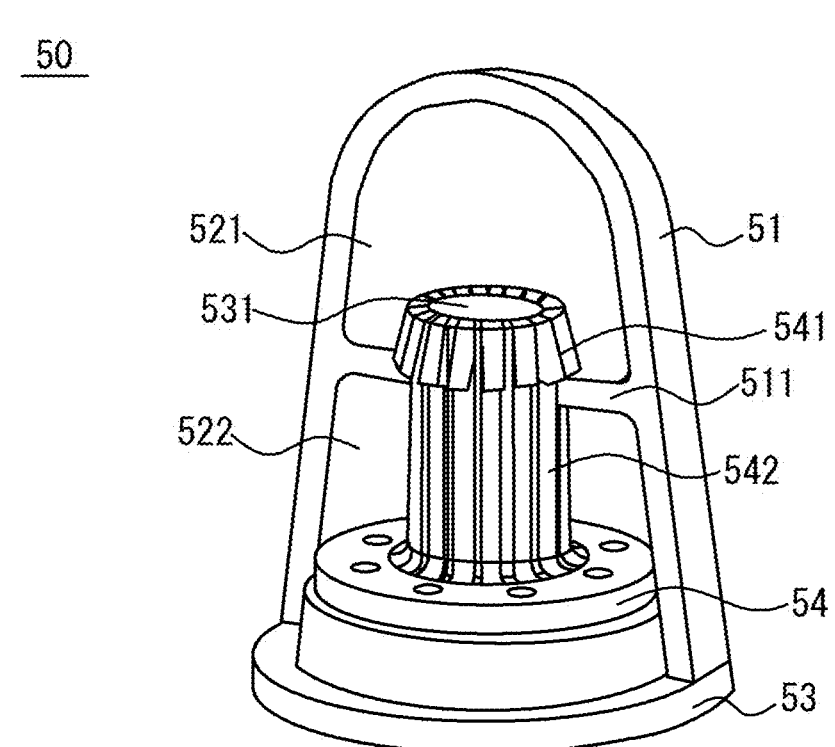

F I G . 1 6 A
50
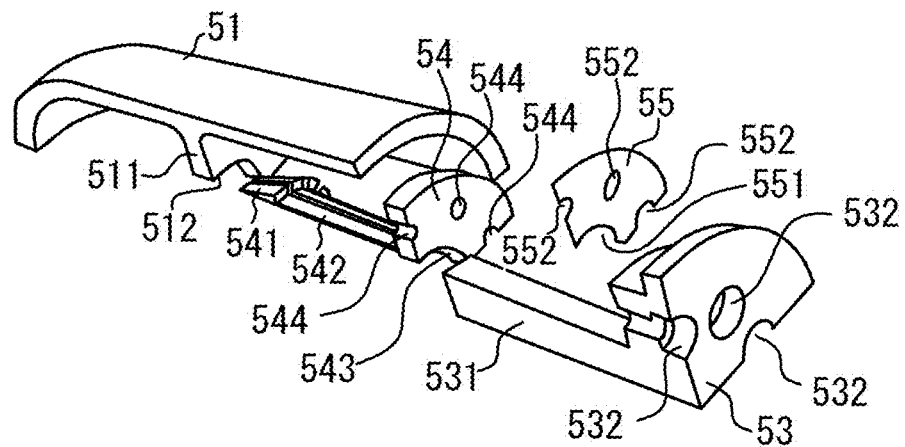
F I G . 1 6 B
50
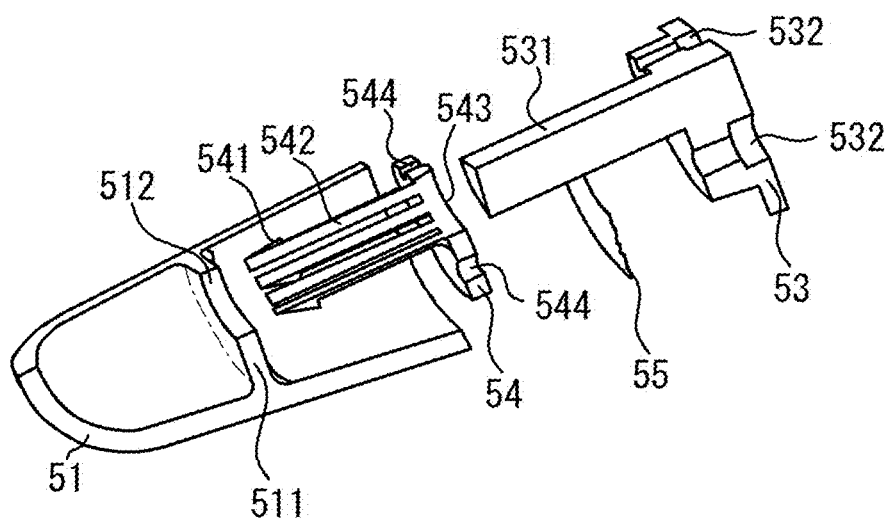

1

HEAT RESISTANT STRUCTURE OF FLYING BODY AND MANUFACTURING METHOD OF HEAT RESISTANT STRUCTURE OF FLYING BODY

CROSS REFERENCE

This application claims priority of Japanese Patent Application No. 2021-186997, filed on Nov. 17, 2021, the disclosure of which is incorporated herein by reference.

TECHNICAL FIELD

The present invention relates to a heat resistant structure of a flying body and a manufacturing method of a heat resistant structure of a flying body, and can be suitably used for a heat resistant structure of a flying body, of which a surface temperature reaches 1600° C. or higher and even an order of 2000° C. or higher, by moving at high speed in an atmosphere, and for a manufacturing method of the heat resistant structure of the flying body, for example.

BACKGROUND

When a flying body moves in an atmosphere at high speed, a tip part of the flying body becomes extremely hot due to aerodynamic heating or the like. Particularly, in case of a flying body that moves in an atmosphere at supersonic speeds, there is a problem of stability of a shape of the tip part so that the tip part of the flying body does not melt, does not wear, or the shape thereof does not change, due to aerodynamic heating. In addition, there is a problem of thermal insulation of the tip part so that heat is not transferred from the tip part that has become hot due to aerodynamic heating to a body part of the flying body. Furthermore, there is a problem of weight of the tip part so that a proper overall weight balance of the flying body is maintained. However, no material is known that can solve these problems at a same time.

As an example, refractory metals such as tungsten are known to have a very high melting point. However, a surface of a refractory metal is oxidized when moving in an atmosphere at high speeds. Refractory metal oxides have a relatively low melting point and may wear out during high-speed movement in the atmosphere. In case of tungsten, although the melting point thereof is 3380° C., it is oxidized to tungsten trioxide (WO$_3$) in an oxygen atmosphere of 700° C. or higher, and the melting point of this oxide is 1473° C. Therefore, tungsten is consumed in an oxygen atmosphere reaching 1600° C. or higher, and further an order of 2000° C. or higher. In addition, refractory metals have a relatively high thermal conductivity, and a heat of heated refractory metals may be transferred to the body part. Furthermore, refractory metals have relatively high specific gravity. Therefore, although it is a conventional general option to configure the tip part of a flying body with refractory metal, this is not suitable in case of a flying body of which a surface temperature reaches an order of 2000° C. or higher by flying in the atmosphere at high speeds and in which it is desired that the tip part does not wear even if an agile attitude control is performed.

As another example, an ablator such as carbon phenol is known to be rapidly worn by thermal decomposition. As an example, resins such as phenol are thermally decomposed at temperatures on an order of 200° C. to 300° C. It is a conventional general option to configure a tip part of a flying body with an ablator because by placing an ablator on a surface of a flying body the body thereof arranged inside can be thermally protected; however, this is not suitable for an above-mentioned flying body neither.

As yet another example, carbon fiber reinforced carbon composite materials are known to have high specific strength, that is, are known to have both high strength and low specific gravity. However, carbon fiber reinforced carbon composite materials are oxidized in an oxygen atmosphere of 400° C. or higher to become a gas such as carbon monoxide (CO) and are severely worn. Generally, by applying a silicon carbide (SiC) coating or the like, antioxidative properties are imparted to carbon fiber reinforced carbon composite materials; however, even so, the antioxidative effect is poor and does not function in an environment of 1600° C. or higher. In addition, carbon fiber reinforced carbon composite materials have a relatively high thermal conductivity and heat of heated carbon fiber reinforced carbon composite materials may be transferred to the body part. Therefore, although it is a conventional general option to configure a tip part of a flying body that moves in the atmosphere at high speeds with carbon fiber reinforced carbon composite materials, this is not suitable for a case of an above-mentioned flying body neither.

In relation to the above, non-patent literature 1 (Yi Zeng et al., "Microstructure and ablation behavior of carbon/carbon composites infiltrated with Zr—Ti", Carbon Volume 54, 2013, pp. 300-309) discloses a method of impregnating molten zirconium in a carbon fiber reinforced carbon composite material.

CITED LIST

[Non-Patent Literature 1] Yi Zeng et al., "Microstructure and ablation behavior of carbon/carbon composites infiltrated with Zr—Ti", Carbon Volume 54, 2013, pp. 300-309.

SUMMARY

In view of the above-mentioned circumstances, an objective of the present disclosure is to provide a heat resistant structure of a flying body having a tip part that is capable of withstanding aerodynamic heating generated when moving in the atmosphere at high speed, and a manufacturing method of the heat resistant structure of the flying body. Other problems to solve and new features will be apparent from descriptions of the present specification and attached drawings.

A heat resistant structure of a flying body according to an embodiment is provided with a tip part and a body pail. The tip part is arranged at a front end of the flying body with respect to a direction of travel of the flying body. The body part is arranged in a back direction from the tip part with respect to the direction of travel of the flying body. The tip part is provided with a surface member, a base part, and an insulation member. The surface member is arranged on an outer surface of the tip part and has a melting point higher than a desired temperature. The base part couples the surface member to the body part. The insulation member is arranged between the surface member and the base part and thermally insulate the base part from the surface member.

A manufacturing method of a heat resistant structure of a flying body according to an embodiment includes: manufacturing a tip part that is to be arranged at a front end of the flying body with respect to a direction of travel of the flying body; manufacturing a body part that is to be arranged in a back direction from the tip part with respect to the direction of travel of the flying body; and manufacturing the flying body by coupling the tip part and the body part. The manufacturing the tip part includes: manufacturing a surface member that is provided to cover a surface of the tip part and that has a melting point higher than a desired temperature; manufacturing a base part that couples the surface member to the body part; and arranging an insulation member, that thermally insulates the base part from the surface member, between the surface member and the base part. The manufacturing the surface member includes immersing a carbon fiber reinforced carbon composite material that has a shape of the surface member in a molten zirconium so that zirconium is impregnated on at least an outer surface of the carbon fiber reinforced carbon composite material and that a carbon of the carbon fiber reinforced carbon composite material as a base material and the zirconium react into a zirconium alloy; and withdrawing the carbon fiber reinforced carbon composite material from the molten zirconium and cooling the carbon fiber reinforced carbon composite material.

According to an embodiment, a tip part having a heat resistant structure of a flying body manufactured by the manufacturing method of the heat resistant structure of the flying body can withstand an aerodynamic heat generated when moving in the atmosphere at high speed.

BRIEF DESCRIPTION OF THE DRAWINGS

FIG. 1 is a perspective view that shows a configuration example of a flying body according to an embodiment.

FIG. 4A is a cross-sectional view, by the section line A-A shown in FIG. 3A, that shows a configuration example of the tip part according to an embodiment, FIG. 4B is a cross-sectional view, by the section line B-B shown in FIG. 3A, that shows a configuration example of the tip part according to an embodiment.

FIG. 4C is a cross-sectional view, by the section line C-C shown in FIG. 4A and FIG. 4B, that shows a configuration example of the tip part according to an embodiment.

FIG. 4D is a cross-sectional view, by the section line D-D shown in FIG. 4A and FIG. 4B, that shows a configuration example of the tip part according to an embodiment.

FIG. 4F, is a perspective view of a portion included in a range F shown in FIG. 4A and FIG. 4B, that shows a configuration example of an abutting member and a base part according to an embodiment.

FIG. 4F is a perspective view of a portion included in a range F shown in FIG. 4A and FIG. 4B, that shows a configuration example of the abutting member and the base part according to an embodiment.

FIG. 6A is a cross-sectional view that shows a first state in an example of a manufacturing method of the surface member of the flying body according to an embodiment.

FIG. 6B is a cross-sectional view that shows a second state in an example of the manufacturing method of the surface member of the flying body according to an embodiment.

FIG. 6C is a cross-sectional view that shows a third state in an example of the manufacturing method of the surface member of the flying body according to an embodiment, FIG. 7A is a cross-sectional view that shows a first state in an example of the manufacturing method of the surface member of the flying body according to an embodiment.

FIG. 7B is a cross-sectional view that shows a second state in an example of the manufacturing method of the surface member of the flying body according to an embodiment.

FIG. 10A is a partial cross-sectional view that shows a configuration example of the tip part according to an embodiment.

FIG. 10B is a partially enlarged cross-sectional view of a portion of FIG. 10A.

FIG. 13A is a disassembled perspective view of a portion in a range H shown in FIG. 12B, that shows a configuration example of the surface member, the base part, and the fastening member according to an embodiment.

FIG. 13B is a disassembled perspective view of a portion in a range H shown in FIG. 12B, that shows a configuration example of the surface member, the base part, and the fastening member according to an embodiment.

FIG. 15 is a partial cross-sectional view that shows a configuration example of the tip part according to an embodiment.

FIG. 16A is a disassembled perspective view that shows a configuration example of the tip part according to an embodiment.

FIG. 16B is a disassembled perspective view that shows a configuration example of the tip part according to an embodiment.

DETAILED DESCRIPTION

An embodiment for implementing a heat resistant structure of a flying body and a manufacturing method of a heat resistant structure of a flying body according to the present invention will be described below with reference to attached drawings.

(First embodiment) As shown in FIG. 1, a flying body 1 according to an embodiment is provided with a body part 10 and a tip part 20. The tip part 20 is arranged at a front end of the flying body 1 with respect to a direction X of travel. The body part 10 is arranged in a back direction from the tip part 20 with respect to the direction X of travel.

Figure 2:
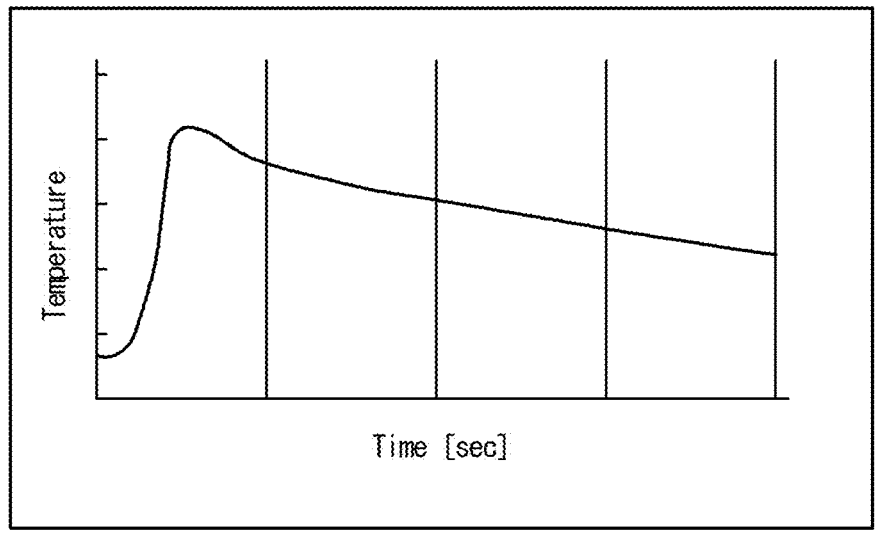
FIG. 2 is a graph that shows an example of a change over time of a surface temperature of a tip part when the flying body according to an embodiment moves in the atmosphere at high speed.

As shown in FIG. 2, when the flying body 1 moves in an atmosphere with high speed, a surface temperature of the tip part 20 changes over time. In the graph of FIG. 2, the horizontal axis represents time, and the vertical axis represents the surface temperature of the tip part 20. In the example of FIG. 2, the surface temperature of the tip part 20 rapidly increases as the flying body 1 starts moving in the atmosphere and then this surface temperature slowly decreases; however, the present embodiment is not limited to this example.

When the flying body 1 moves in the atmosphere at an extremely high speed such as supersonic speed, a surface of the flying body 1, especially a surface of the tip part 20, is heated by an aerodynamic heating. At that time, this surface temperature may exceed a melting point of some materials.

Figure 3A:
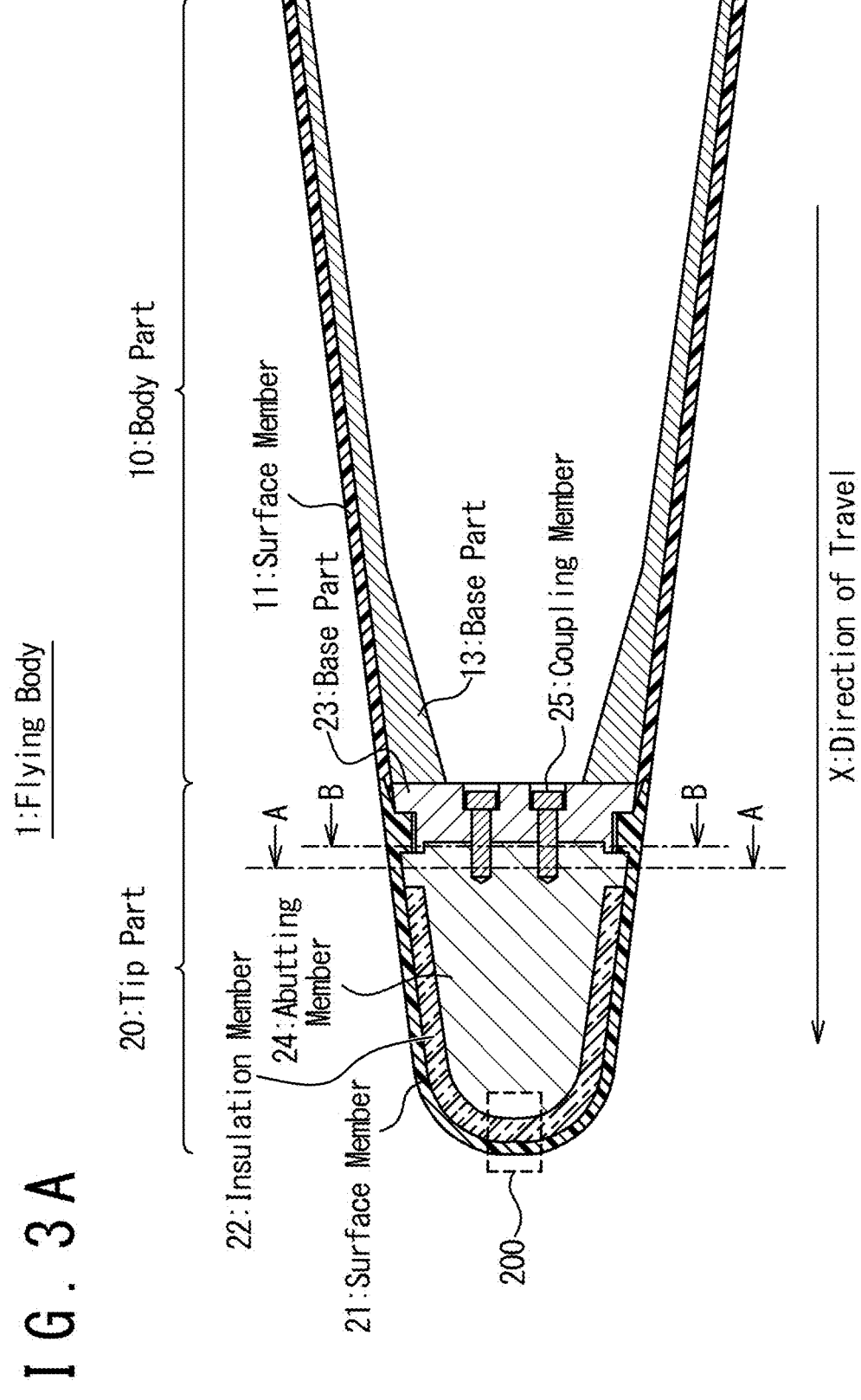
FIG. 3A is a cross-sectional view that shows a configuration example of the flying body according to an embodiment.

As shown in FIG. 3A, the body part 10 of the flying body 1 according to an embodiment is provided with a surface member 11 arranged on an outer surface of the body part 10 and a base part 13 covered by the surface member 11. In addition, the tip part 20 of the flying body 1 according to an embodiment has a shape like a bell and is provided with a surface member 21 arranged on an outer surface of the tip part 20, a base part 23 that couples the tip part 20 to the base part 13 of the body part 10, and an insulation member 22 arranged between the surface member 21 and an abutting member 24. The tip part 20 is further provided with the abutting member 24 that holds an insulation member 22 between the abutting member 24 itself and the surface member 21. The abutting member 24 is coupled to the base part 23 by a coupling member such as a bolt 25. As an example, the base part 23 and the abutting member 24 are configured with a same material. In this case, it can be said that the entire set of the abutting member 24 and the base part 23 is the base part 23 and that the abutting member 24 is a part of the base part 23.

The surface member 21 according to an embodiment is provided with a heat resistant material having a melting point higher than a desired temperature. As an example, this temperature is a maximal temperature reached on a surface of the flying body 1 when the flying body 1 moves in the atmosphere at a desired speed and is heated by an aerodynamic heating or the like. It should be noted that the surface member 11 of the body part 10 may be configured with an ablator.

The insulation member 22 according to an embodiment is configured to thermally insulate the base part 23 from the surface member 21. Furthermore, the insulation member 22 shuts off heat input from the surface member 21 to the abutting member 24. As a result, the base part 23 and the abutting member 24 can be configured with a material having a melting point lower than the maximal temperature reached on the surface temperature of the flying body 1. It is preferable that the material configuring the base part 23 and the abutting member 24 has a relatively high toughness and a relatively low thermal conductivity. It should be noted that the base part 13 of the body part 10 may be configured with a same material as the base part 23 and the abutting member 24.

The base part 23 according to an embodiment is configured to couple the surface member 21 to the body part 10. More specifically, the base part 23 of the tip part 20 is configured to be coupled to the base part 13 of the body part 10. There is no limitation in a method of coupling the base part 23 and the base part 13 according to an embodiment.

Figure 3B:
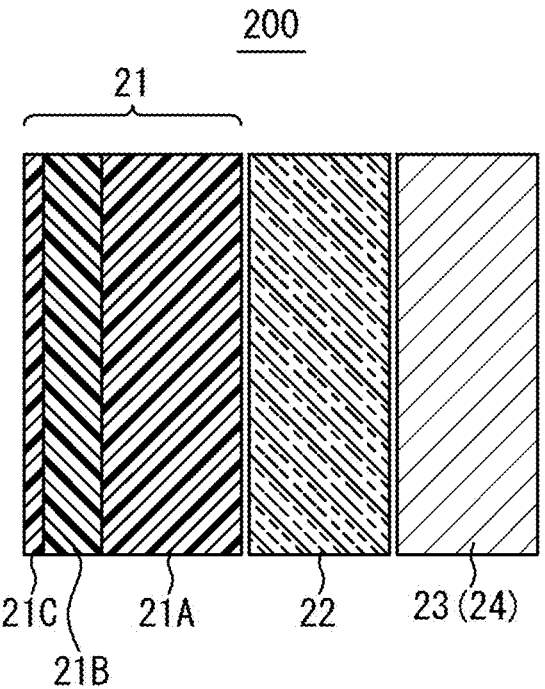
FIG. 3B is a partial cross-sectional view that shows a configuration example of the tip part according to an embodiment.

FIG. 3B is a partial cross-sectional view that shows a configuration example of the tip part 20 according to an embodiment. The region 200 shown in FIG. 3B corresponds to an edge part of the tip part 20 shown in FIG. 3A, in the front direction with respect to the direction of travel of the flying body 1. As shown in FIG. 3B, the material of the surface member 21 may not be homogenous. In the example of FIG. 3B, the surface member 21 includes a layer of zirconium carbide on at least an outer surface thereof when viewed from the flying body 1. The zirconium carbide is a type of zirconium alloys and is generated by an impregnation of zirconium in a carbon fiber reinforced carbon composite material as a base material and a reaction of a carbon in this carbon fiber reinforced carbon composite material and the zirconium. A carbon fiber reinforced carbon composite material in which no zirconium carbide is generated may exist on an inner surface of the surface member 21 when viewed from the flying body 1. A layer of the carbon fiber reinforced carbon composite material in which no zirconium carbide exists will be referred to as a first layer 21A. In addition, a layer of the carbon fiber reinforced carbon composite material in which the zirconium carbide is generated will be referred to as a second layer 21B. A layer of zirconium oxide (also called zirconia) generated by an oxidation of the zirconium carbide may exist on the outer surface of the surface member 21. This oxide layer may be generated by an aerodynamic heating that the flying body 1 receives when moving in the atmosphere including oxygen at high speed. This oxide film will be referred to as a third layer 21C. The carbon fiber reinforced carbon composite material of the first layer 21A has a sufficient strength to retain the shape of the surface member 21 even when the flying body 1 moves in the atmosphere at high speed. The zirconium carbide of the second layer 21B and the zirconium oxide of the third layer 21C have a melting point higher than the maximal temperature reached on the surface of the flying body 1. Specifically, the melting point of the zirconium carbide is between 3532° C. and 3540° C., the melting point of the zirconium oxide is 2715° C., the surface of the surface member 21 has resistance to temperatures lower than these melting points.

An insulation member 22 is arranged in an inner direction from the first layer 21A of the surface member 21 when viewed from the flying body 1. Furthermore, the base part 23 (and/or the abutting member 24) is/are arranged in the inner direction from the insulation member 22. As described above, the heat resistant structure of the flying body 1 according to an embodiment is provided with a three-layer structure including the surface member 21, the insulation member 22 and the base part 23. It should be noted that, although the surface member 21, the insulation member 22, and the base part 23 are shown in FIG. 3B as if there are gaps between each of them, this is in a purpose to distinguish from the three-layer structure of the surface member 21, and it is preferable that the surface member 21, the insulation member 22, and the base part 23 are in close contact with each other, actually. However, there is no limitation in that there may be a gap between each of the surface member 21, the insulation member 22, and the base part 23.

A specific configuration example of the tip part 20 of the flying body 1 according to an embodiment will be described with reference to FIG. 4A to FIG. 4F. FIG. 4A is a cross-sectional view, by the section line A-A shown in FIG. 3A, that shows a configuration example of the tip part 20 according to an embodiment. FIG. 4B is a cross-sectional view, by the section line B-B shown in FIG. 3A, that shows a configuration example of the tip part 20 according to an embodiment. FIG. 4C is a cross-sectional view, by the section line C-C shown in FIG. 4A and FIG. 4B, that shows a configuration example of the tip part 20 according to an embodiment. FIG. 4D is a cross-sectional view, by the section line D-D shown in FIG. 4A and FIG. 4B, that shows a configuration example of the tip part 20 according to an embodiment. FIG. 4E is a perspective view of a portion included in a range E shown in FIG. 4A and FIG. 4B, that shows a configuration example of an abutting member 24 and a base part 23 according to an embodiment. FIG. 4F is a perspective view of a portion included in a range F shown in FIG. 4A and FIG. 4B, that shows a configuration example of the abutting member 24 and the base part 23 according to an embodiment.

As shown in FIG. 4B and FIG. 4C, the surface member 21 is provided with a surface member protrusion 211 that protrudes from an inner surface of the surface member 21 to an inner space of the surface member 21. In addition, as shown in FIG. 4B, the surface member 21 is further provided with a surface member concavity 212 that is adjacent to the surface member protrusion 211 in a circumferential direction R. Furthermore, as shown in FIG. 4B, the surface member 21 may be provided with a plurality of surface member protrusions 211 and a plurality of surface member concavities 212 that are arranged adjacent to each other one by one in the circumferential direction R.

As shown in FIG. 4A and FIG. 4C, the abutting member 24 is provided with an abutting member protrusion 242 that protrudes from an outer surface of the abutting member 24 to outside the abutting member 24. In addition, as shown in FIG. 4A, the abutting member 24 is further provided with an abutting member concavity 243 that is to be adjacent to the abutting member protrusion 242 in the circumferential direction R. Furthermore, as shown in FIG. 4A, the abutting member 24 may be provided with a plurality of abutting member protrusions 242 and a plurality of abutting member concavities 243 that are arranged adjacent to each other one by one in the circumferential direction R.

As shown in FIG. 4C and FIG. 4D, the abutting member 24 is further provided with an outer surface as a holding part 241 that holds the insulation member 22 between the holding part 241 and the inner surface of the surface member 21.

As shown in FIG. 4A, FIG. 4B, FIG. 4D, FIG. 4E and FIG. 4F, the base part 23 is provided with a circumferential direction restrainer 231 that protrudes from the back direction to the front direction with respect to the direction X of travel. The circumferential direction restrainer 231 is shaped to be insertable from the back direction to the front direction to penetrate through the surface member concavity 212 and the abutting member concavity 243 in an overlapped state in the direction X of travel. At that time, the surface member protrusion 211 and the abutting member protrusion 242 are in a state of being overlapped in the direction X of travel, and the circumferential direction restrainer 231 is shaped to restrain the surface member protrusion 211 and the abutting member protrusion 242 from rotating in the circumferential direction R.

As shown in FIG. 4A, FIG. 4B, FIG. 4C and FIG. 4D, the base part 23 and the abutting member 24 are coupled by a bolt 25 as a coupling member. There may be a plurality of bolts 25. It should be noted that, as shown in FIG. 4E and FIG. 4F, the base part 23 and the abutting member 24 are provided with bolt holes 250 to be coupled by the bolts 25.

As shown in FIG. 4C, in a state in which the surface member protrusion 211 and the abutting member protrusion 242 are overlapped in the direction X of travel, the abutting member protrusion 242 is arranged in the front direction from the surface member protrusion 211 with respect to the direction X of travel and the abutting member protrusion 242 is abutting on a front surface of the surface member protrusion 211.

Figure 5A:
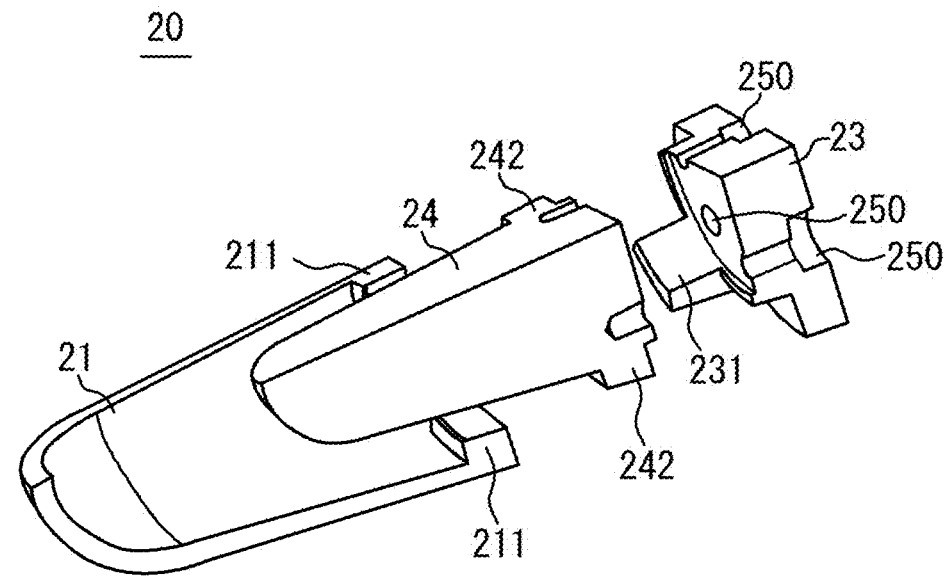
FIG. 5A is a disassembled perspective view that shows a configuration example of a surface member, an insulation member, and the base part according to an embodiment.
Figure 5B:
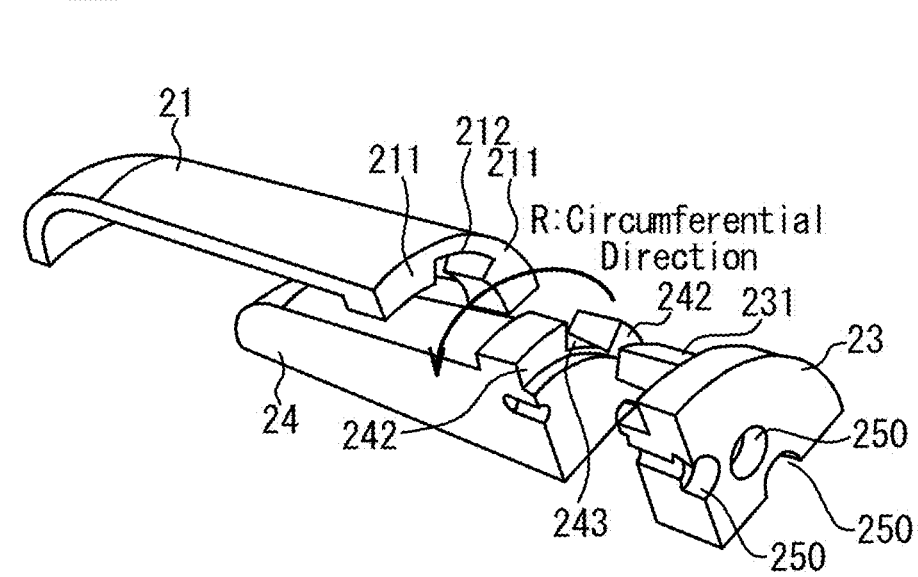
FIG. 5B is a disassembled perspective view that shows a configuration example of a surface member, an insulation member, and the base part according to an embodiment.

An example of a manufacturing method of the tip part 20 according to an embodiment will be described with reference to FIG. 5A and FIG. 5B. FIG. 5A is a disassembled perspective view that shows a configuration example of a surface member 21, an abutting member 24, and the base part 23 according to an embodiment. FIG. 5B is a disassembled perspective view that shows a configuration example of a surface member 21, an abutting member 24, and the base part 23 according to an embodiment.

At first, the insulation member 22 is inserted from an opening of the surface member 21 in the back direction with respect to the direction X of travel into the inner space of the surface member 21, and the insulation member 22 is arranged to fit along the inner surface of the surface member 21. In FIG. 5A and FIG. 5B, the insulation member 22 is not shown for ease of viewing.

Next, the abutting member 24 is inserted from the opening of the surface member 21 into the inner space of the surface member 21. At that time, a relative positional relationship between the surface member 21 and the abutting member 24 is appropriately adjusted by rotating them in the circumferential direction R or in an opposite direction thereof. By doing so, the abutting member protrusion 242 of the abutting member 24 can pass through the surface member concavity 212 of the surface member 21 in the direction X of travel. Herein, the abutting member concavity 243 is shaped so that the surface member protrusion 211 can pass therethrough and the surface member concavity 212 is shape so that the abutting member protrusion 242 can pass therethrough. For example, the abutting member concavity 243 is formed in a shape that the surface member protrusion 211 can pass through and the surface member concavity 212 is formed in a shape that the abutting member protrusion 242 can pass through.

After the abutting member 24 is inserted into the inner space of the surface member 21, the relative positional relationship between the abutting member 24 and the surface member 21 is appropriately adjusted by rotating them in the circumferential direction R. By doing so, a state can be obtained in which the surface member protrusion 211 and the abutting member protrusion 242 are overlapped in the direction X of travel and the surface member concavity 212 and the abutting member concavity 243 are overlapped in the direction X of travel.

In this state, the base part 23 is moved in the direction X of travel so that the circumferential direction restrainer 231 of the base part 23 penetrates through the surface member concavity 212 and the abutting member concavity 243 that are overlapped, and that the base part 23 abuts on the abutting member 24. At that time, as described above, the surface member protrusion 211 and the abutting member protrusion 242 are restrained by the circumferential direction restrainer 231 and the relative positional relationship between the surface member 21 and the abutting member 24 in the circumferential direction R is restrained. In addition, at that time, the surface member protrusion 211 is restrained by the abutting member protrusion 242 and the base part 23 in the direction X of travel. In this state, by coupling the base part 23 to the abutting member 24 by use of the bolt 25, the surface member 21, the insulation member 22, the abutting member 24 and the base part 23 are coupled, and the tip part 20 in the state shown in FIG. 4A to FIG. 4D is obtained.

In relation to the structure of the surface member 21 shown in FIG. 3B, an example of a method of impregnating a zirconium 70 in a carbon fiber reinforced carbon composite material 60 to generate a zirconium carbide will be described with reference to FIG. 6A to FIG. 6C.

At first, the carbon fiber reinforced carbon composite material 60 and the zirconium 70 are prepared, as shown in FIG. 6A. Next, by making the zirconium 70 melt, the molten zirconium 71 is impregnated inside the carbon fiber reinforced carbon composite material 60, as shown in FIG. 6B. As a result, a zirconium carbide 61, that is generated by a reaction of the zirconium 70 with a carbon in the carbon fiber reinforced carbon composite material 60, is obtained as shown in FIG. 6C. Although the zirconium 70 is prepared in a pellet form in the example of FIG. 6A, it should be noted that the present disclosure is not limited to this example, and the zirconium 70 may be for example in a powder form, a paste form, or another form that can coat the surface of the carbon fiber reinforced carbon composite material 60.

An example of a manufacturing method of the surface member 21 according to an embodiment will be described with reference to FIG. 7A to FIG. 7C, by applying the method described with reference to FIG. 6A to FIG. 6C.

At first, as shown in FIG. 7A, the carbon fiber reinforced carbon composite material 6 having a shape of the surface member 21 is attached to a lift device 84. In addition, a molten zirconium 72 is prepared in a carbon crucible 82 heated by a carbon heater 83. The carbon crucible 82 may be mounted on a crucible stand 81 and rotated.

Next, as shown in FIG. 7B, the lift device 84 is operated to lift the carbon fiber reinforced carbon composite material 6 down to immerse the carbon fiber reinforced carbon composite material 6 into the molten zirconium 72 in the carbon crucible 82 so that the zirconium is impregnated on at least an outer surface of the carbon fiber reinforced carbon composite material 6 and that the carbon in the carbon fiber reinforced carbon composite material 6 and the zirconium react in to the zirconium carbide.

Figure 7C:
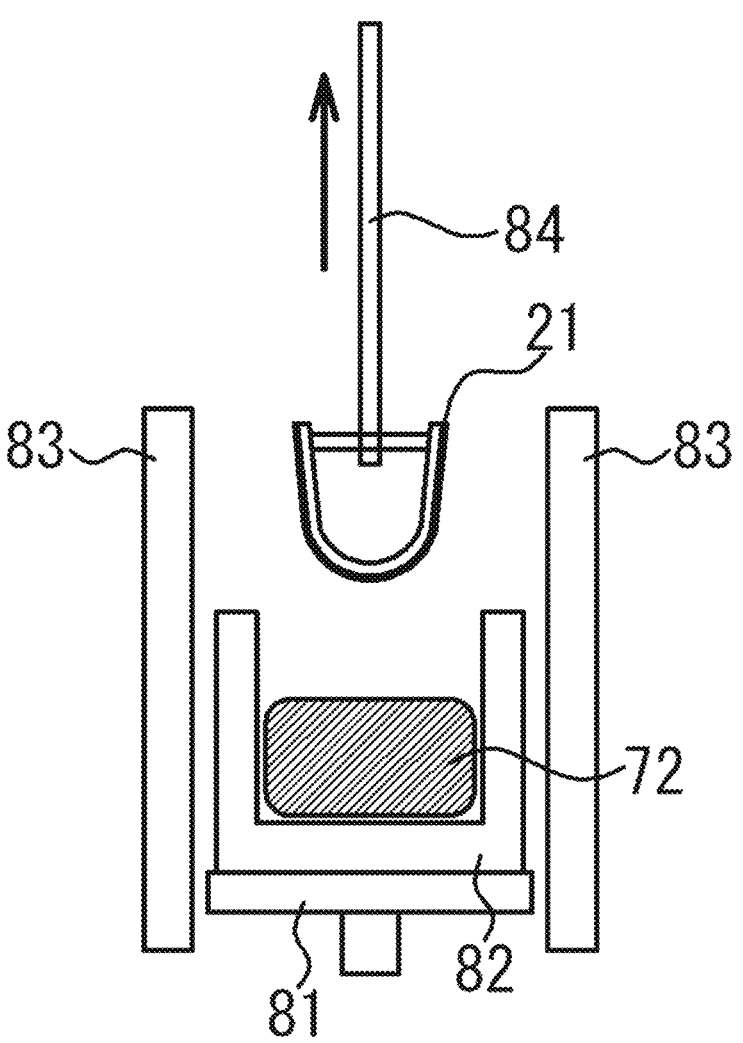
FIG. 7C is a cross-sectional view that shows a third state in an example of the manufacturing method of the surface member of the flying body according to an embodiment.

Next, as shown in FIG. 7C, the lift device 84 is operated to lift the carbon fiber reinforced carbon composite material 6 up to withdraw the carbon fiber reinforced carbon composite material 6 from the carbon crucible 82 and cool. By immersing the carbon fiber reinforced carbon composite material 6 in the molten zirconium 72 and generating the zirconium carbide, the surface member 21 is obtained.

As shown in FIG. 7A, FIG. 7B and FIG. 7C, the carbon fiber reinforced carbon composite material 6 in a state in Which a portion corresponding to a front edge with respect to the direction X of travel of the surface member 21 is directed downward may be immersed in the molten zirconium 72. By immersing the carbon fiber reinforced carbon composite material 6 in the molten zirconium 72 from the front edge first and withdrawing from the molten zirconium 72 from the back first, a time during which the carbon fiber reinforced carbon composite material 6 is immersed in the molten zirconium becomes the longest at the front edge of the surface member 21 and becomes shorter in a portion further from this edge. As a result, a density of the zirconium carbide in the heat resistant material provided to the surface member 21 decreases continuously from the front direction to the back direction with respect to the direction X of travel. It should be noted that the density of the zirconium carbide in the heat resistant material may be made homogenous by an impregnation with a sufficient time.

A manufacturing method of the flying body 1 according to an embodiment will be described. At first, as described with reference to FIG. 7A to FIG. 7C, the surface member 21 to cover the surface of the tip part 20 is manufactured. On the other hand, the insulation member 22, the base part 23, and the abutting member 24 shown in FIG. 4A to FIG. 4F are manufactured. Next, as described with reference to FIG. 5A and FIG. 5B, the surface member 21, the insulation member 22, the base part 23, and the abutting member 24 are assembled to manufacture the tip part 20. At that time, the heat resistant structure of the flying body 1 according to an embodiment is manufactured. On the other hand, the body part 10 shown in FIG. 1 is manufactured. Next, the tip part 20 and the body part 10 are coupled to manufacture the flying body 1.

As described above, according to an embodiment, by the three-layer structure of the surface member 21 as a heat resistant material, the insulation member 22, and the base part 23 (with the abutting member 24), the tip part 20 that can withstand an aerodynamic heating generated when the flying body 1 is moving in the atmosphere at high speed and the flying body 1 provided with this tip part 20 are implemented. In addition, as a volume of the abutting member 24 is relatively large and a thermal capacity thereof is relatively large, heat generated at the front edge of the surface member 21 is hard to be transferred to the body part 10.

It should be noted that the surface member 21 may be deformed due to aerodynamic heating or the like. Specifically, the surface member 21 may be deformed by a thermal expansion due to aerodynamic heating, a weighting due to dynamic pressure during a flight, or the like. When a length of the surface member 21 with respect to the direction X of travel is extended, a reaction force of this deformation is received by the front direction surface of the base part 23 that abuts on a back edge of the surface member 21 with respect to the direction X of travel. In this point of view as well, it is preferable that the material configuring the base part 23 is sufficiently sturdy.

Figure 8:
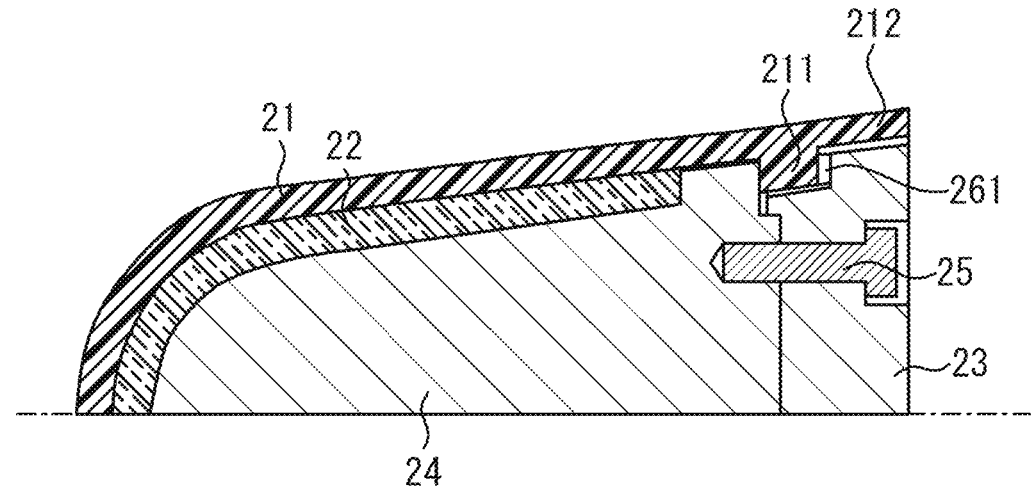
FIG. 8 is a partial cross-sectional view that shows a configuration example of the tip part according to an embodiment.

A variation example of the tip part 20 according to an embodiment will be described with reference to FIG. 8. As shown in FIG. 8, a gasket 261 may be arranged between the surface member 21 and the base part 23. In the variation example shown in FIG. 8, the gasket 261 relieves a stress due to a deformation of the surface member 21.

Figure 9:
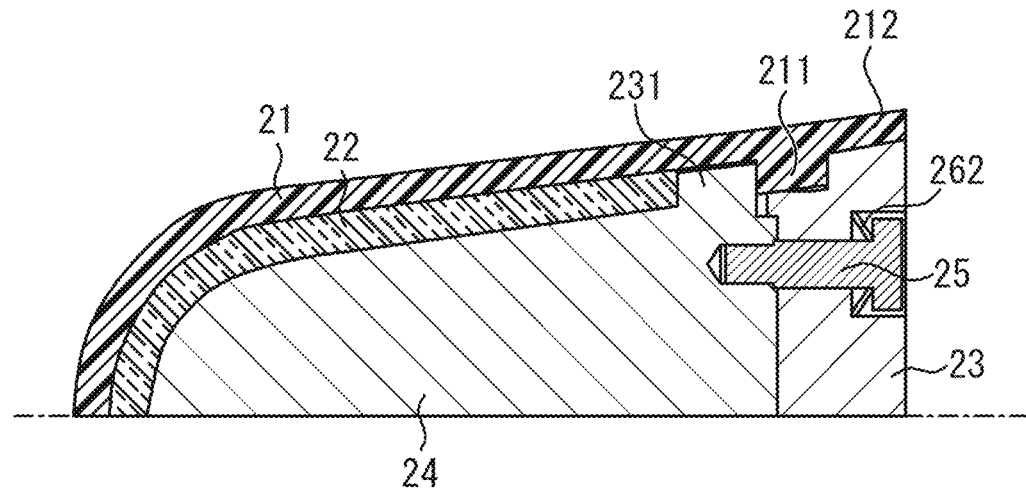
FIG. 9 is a partial cross-sectional view that shows a configuration example of the tip part according to an embodiment.

Another variation example of the tip part 20 according to an embodiment will be described with reference to FIG. 9. As shown in FIG. 9, a disc spring 262 as a biasing device may be arranged between the base part 23 and a head of the bolt 25 as a coupling member. In the variation example shown in FIG. 9, the disc spring 262 as a biasing device biases the bolt 25 as a coupling member to the back direction with respect to the direction X of travel. Since the bolt 25 penetrates through the base part 23 and is fastened to the abutting member 24, the disc spring 262 as a biasing device relieves a stress generated by a deformation of the surface member 21 due to an aerodynamic heating or the like.

As described above, in the variation examples shown in FIG. 8 and FIG. 9, the stress generated by a deformation of the surface member 21 due to aerodynamic heating can be relieved inside the tip part 20.

(Second embodiment) A flying body 1 according to the present embodiment can be obtained by coupling a tip part 30 according to the present embodiment to the body part 10, instead of the tip part 20 of the flying body 1 shown in FIG. 3A. In the following, it will be mainly described about portions of the configuration of the tip part 30 according to the present embodiment that are different from the configuration of the tip part 20 according to the first embodiment.

Figure 10C:
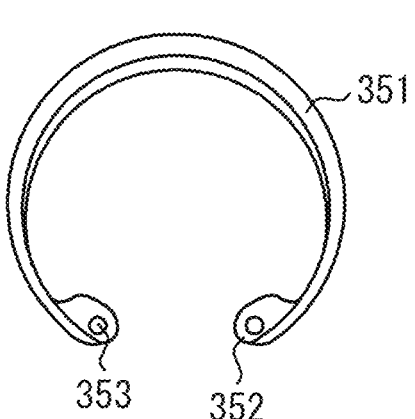
FIG. 10C is a front view that shows a configuration example of a C-shape retaining ring according to an embodiment.

A configuration example of the tip part 30 according to an embodiment will be described with reference to FIG. 10A to FIG. 10C. FIG. 10A is a partial cross-sectional view that shows a configuration example of the tip part 30 according to an embodiment. FIG. 10B is a partially enlarged cross-sectional view of a portion of FIG. 10A. FIG. 10C is a front view that shows a configuration example of a C-shape retaining ring 35 according to an embodiment.

As shown in FIG. 10A and FIG. 10B, the tip part 30 according to the present embodiment is provided with a surface member 31 as a heat resistant material, an insulation member 32, and a base part 33, similarly to the tip part 20 according to the first embodiment shown in FIG. 3B and the like. Furthermore, the tip part 30 according to the present embodiment is provided with a fixing member 34 and a C-shape retaining ring 35 as components corresponding to the abutting member 24 according to the first embodiment. In addition, the tip pan 30 according to the present embodiment is provided with a nut 36 as a component corresponding to the bolt 25 as a coupling member according to the first embodiment.

As shown in FIG. 10A and FIG. 10B, the surface member 31 is provided with a groove 313 provided to go around the inner wall surface of the surface member 31 in the circumferential direction R. A portion of the surface member 31 that is adjacent to the inner wall surface from this groove 313 to the back edge with reference to the direction X of travel will be referred to as a surface member protrusion 311, similarly to the first embodiment. The groove 313 is arranged in the front direction from the surface member protrusion 311. A protrusion is provided to go around the inner wall surface of the surface member 31 in the circumferential direction R in a front direction from the groove 313. This protrusion will be referred to as a surface member abutting part 314. The surface member abutting part 314 protrudes from the inner wall surface of the surface member 31 to the inner space of the surface member 31. A portion of the surface member 31 between the surface member abutting part 314 and the groove 313 will be referred to as a surface member stepping part 312.

As shown in FIG. 10A and FIG. 10B, the C-shape retaining ring 35 is fit into the groove 313. When fitting the C-shape retaining ring 35 into the groove 313, an outer size of the C-shape retaining ring 35 becomes smaller than an inner size of the surface member 31 by deforming the spring part 351 to bring two edge parts 352, 353 closer to each other. By moving the C-shape retaining ring 35 in this state to the groove 313 and releasing the spring part 351 to bring two edge parts 352, 353 apart from each other, the C-shape retaining ring 35 can be fit into the groove 313.

As shown in FIG. 10B, an outer periphery part 342 of the fixing member 34 abuts on the surface member stepping part 312 and is hold between the groove 313 and the surface member abutting part 314 in the direction X of travel.

The fixing member 34 is further provided with a bolt part 341 that extends in the back direction with respect to the direction X of travel. The base part 33 is provided with a penetration hole 331 for this bolt part 341 to penetrate therethrough. The nut 36 as a coupling member is screwed to the bolt part 341 that has penetrated through the penetration hole 331 of the base part 33. The nut 36 couples the base part 33 and the fixing member 34. A washer 37 may be arranged between the nut 36 and the base part 33.

In addition, a portion of the inner space of the surface member 31 in the back direction with respect to the direction X of travel may be cylindrical. In addition, a portion of the outer wall surface 320 of the insulation member 32 in the back direction with respect to the direction X of travel may be a side surface of a cylinder.

Figure 11A:
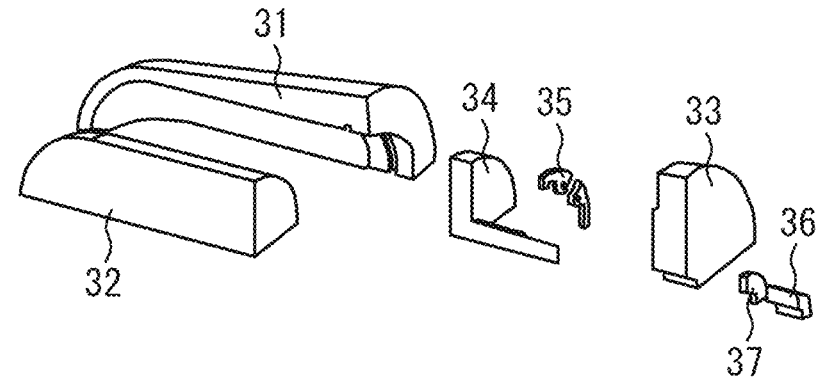
FIG. 11A is a disassembled perspective view that shows a configuration example of the tip part according to an embodiment.
Figure 11B:
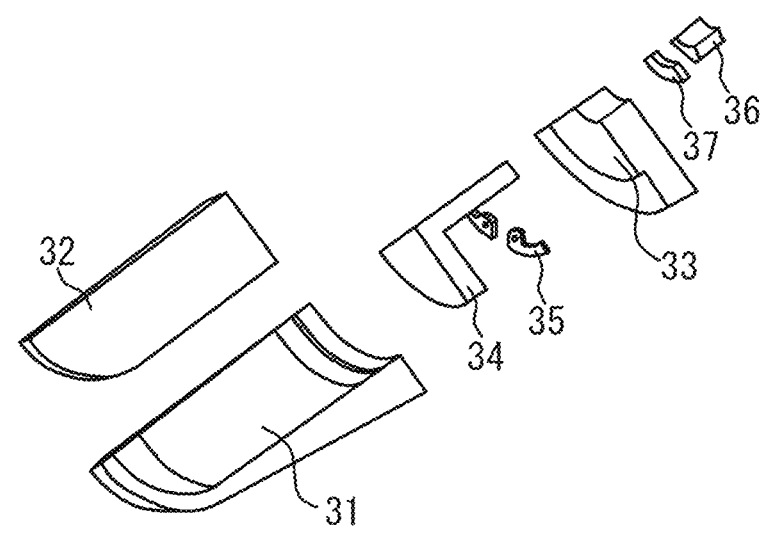
FIG. 11B is a disassembled perspective view that shows a configuration example of the tip part according to an embodiment.
Figure 11C:
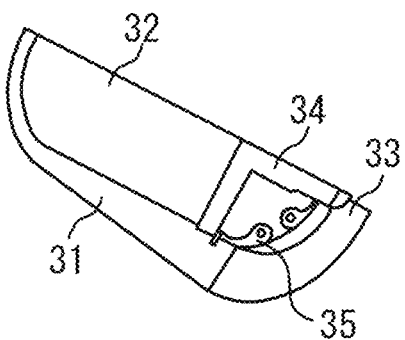
FIG. 11C is a perspective view that shows a configuration example of the tip part according to an embodiment.

An example of a manufacturing method of the tip part 30 according to an embodiment will be described with reference to FIG. 11A to FIG. 11C. FIG. 11A is a disassembled perspective view that shows a configuration example of the tip part 30 according to an embodiment. FIG. 11B is a disassembled perspective view that shows a configuration example of the tip part 30 according to an embodiment. FIG. 11C is a perspective view that shows a configuration example of the tip part 30 according to an embodiment.

At first, the inner space of the surface member 31 is filled with the insulation member 32. Then, the opening part of the surface member 31 is closed with the fixing member 34. By fining the C-shape retaining ring 35 into the groove 313, the fixing member 34 is held between the surface member abutting part 314 of the surface member 31 and the C-shape retaining ring 35. Then, the base part 33 is installed to the back edge of the surface member 31. At that time, the base pan 33 and the fixing member 34 are fastened by penetrating the bolt part 341 of the fixing member 34 through the penetrating hole 331 of the base part 33 and screwing the nut 36 to the bolt part 341. It should be noted that a washer 37 may be arranged between the base part 33 and the nut 36. As a result, the surface member 31, the C-shape retaining ring 35, the fixing member 34, and the base part 33 are coupled.

In the tip part 30 according to the present embodiment, a volume of the fixing member 34 that is to be integrated to the base part 33 is relatively small. As a result, a volume of the insulation member 32 that is filled inside the tip part 30 is relatively large, and heat generated at the front edge of the surface member 31 is hard to be transferred to the fixing member 34. In addition, a degree of freedom with respect to a heat elongation is relatively high and a stress due to this deformation is hard to be generated.

(Third embodiment) A flying body 1 according to the present embodiment can be obtained by coupling a tip part 40 according to the present embodiment to the body part 10 shown in FIG. 3A instead of the tip part 20 of the flying body 1 shown in FIG. 3A. In the following, it will be mainly described about portions of the configuration of the tip part 40 according to the present embodiment that are different from the configuration of the tip pan 20 according to the first embodiment.

Figure 12A:
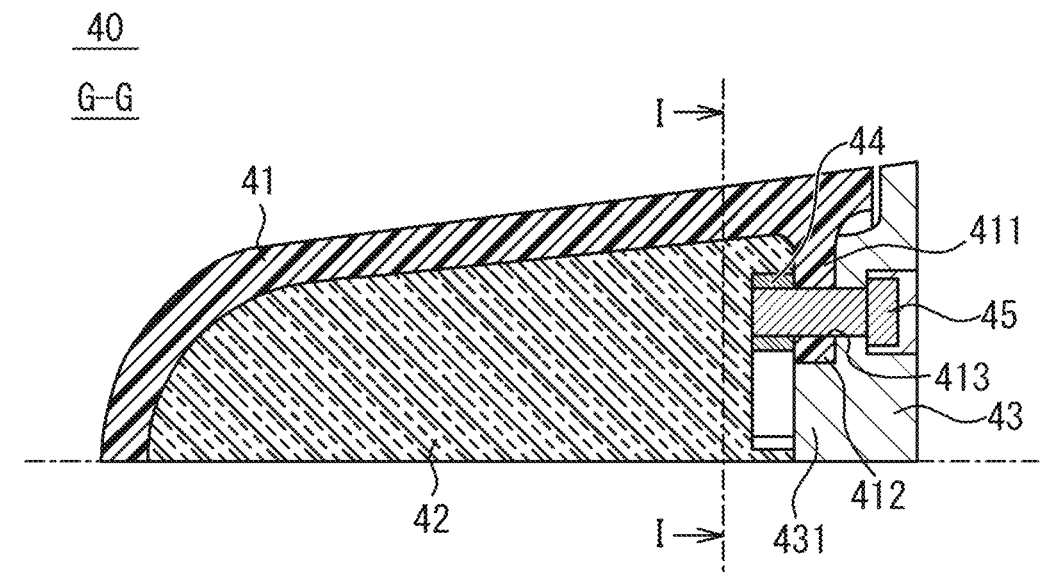
FIG. 12A is a partial cross-sectional view by a section line G-G shown in FIG. 12B, that shows a configuration example of the tip part according to an embodiment.
Figure 12B:
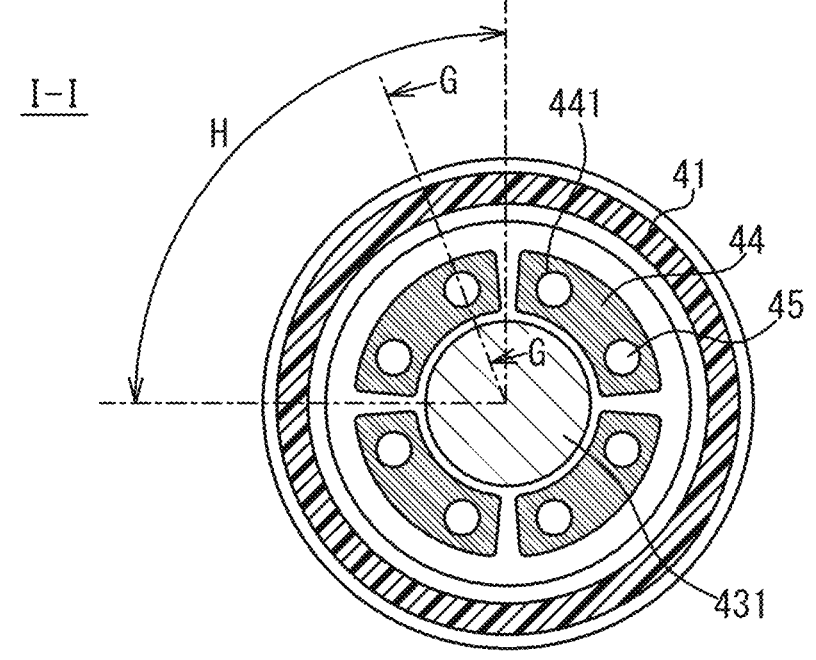
FIG. 12B is a cross-sectional view by a section line I-I shown in FIG. 12A, that shows a configuration example of the surface member, the base part, and a fastening member of the tip part according to an embodiment, except the insulation member.

A configuration example of a tip part 40 according to an embodiment will be described with respect to FIG. 12A and FIG. 12B. FIG. 12A is a partial cross-sectional view that shows a configuration example of the tip part 40 according to an embodiment. FIG. 12B is a cross-sectional view by a section line I-I shown in FIG. 12A, that shows a configuration example of the surface member 41, the base part 43, and a fastening member 44 of the tip part 40 according to an embodiment, except the insulation member 42.

As shown in FIG. 12A and FIG. 12B, the tip part 40 according to the present embodiment is provided with a surface member 41 as a heat resistant material, an insulation member 42, and a base part 43, similarly to the tip part 20 according to the first embodiment shown in FIG. 3B and the like. Furthermore, the tip part 40 according to the present embodiment is provided with a fastening member 44 as a component corresponding to the abutting member 24 according to the first embodiment. In addition, the tip part 40 according to the present embodiment is provided with a bolt 45 corresponding to the bolt 25 as a coupling member according to the first embodiment.

As shown in FIG. 12A, the surface member 41 is provided with a surface member protrusion 411 that protrudes from a whole circumference of an inner surface of the surface member 41 to an inner space of the surface member 41. The surface member protrusion 411 is provided with a penetration hole 412 as a passage connecting outside and inside of the surface member 41. In addition, the surface member protrusion 411 is provided with a bolt penetration hole 413 for a bolt 45 to penetrate therethrough.

As shown in FIG. 12A, the base part 43 is provided with a base part protrusion 431 and a bolt penetration hole 432. The base part protrusion 431 is configured to block the penetration hole 412 of the surface member 41. The bolt penetration hole 432 is shaped so that the bolt 45 penetrates therethrough.

As shown in FIG. 12A, the fastening member 44 is provided with a bolt hole 441 for screwing the bolt 45. As shown in FIG. 12B, the fastening member 44 may be divided into a plurality of fastening members 44 so that each divided fastening member 44 can pass through the penetration hole 412 of the surface member protrusion 411 to be arranged in a front direction from the surface member protrusion 411. The fastening member 44 may be temporarily fixed on a front direction side surface of the surface member protrusion 411 with an adhesive or the like, so that a position of the bolt hole 441 and a position of the bolt penetration hole 413 of the surface member protrusion 411 match, in order to facilitate a screwing of the bolt 45.

As shown in FIG. 12A, the bolt 45 penetrates through the bolt penetration hole 432 of the base part 43 and the bolt penetration hole 413 of the surface member protrusion 411 and is screwed into the bolt hole 441 of the fastening member 44.

A manufacturing method of the tip part 40 according to an embodiment will be described with reference to FIG. 13A and FIG. 13B. FIG. 13A is a disassembled perspective view of a portion in a range H shown in FIG. 12B, that shows a configuration example of the surface member 41, the base part 43, and the fastening member 44 according to an embodiment. FIG. 13B is a disassembled perspective view of a portion in a range H shown in FIG. 12B, that shows a configuration example of the surface member 41, the base part 43, and the fastening member 44 according to an embodiment.

At first, the fastening member 44 is temporarily fixed on a front direction surface of the surface member protrusion 411 of the surface member 41, with an adhesive or the like. At that time, the fastening member 44 passes through the penetration hole 412 of the surface member 41 to enter the inner space of the surface member 41. In addition, the fastening member 44 is temporarily fixed so that the position of the bolt hole 441 and the position of the bolt penetration hole 413 of the surface member 41 match.

Then, the inner space of the surface member 41 is filled with the insulation member 42. At that time, the insulation member 42 passes through the penetration hole 412 of the surface member 41 to enter the inner space of the surface member 41.

Then, the base part 43 is arranged at a back direction edge of the surface member 41 so that the base part protrusion 431 blocks the penetration hole 412 of the surface member 41. At that time, the position of the bolt penetration hole 432 of the base part 43 is made to match with the position of the bolt penetration hole 413 of the surface member protrusion 411 and the position of the bolt hole 441 of the fastening member 44.

Then, the bolt 45 is screwed to the bolt hole 441 of the fastening member 44 and fastened. At that time, the bolt 45 penetrates through the bolt penetration hole 432 of the base part 43 and the bolt penetration hole 413 of the surface member protrusion 411. As a result, the surface member 41 and the base part 43 are coupled. In addition, the insulation member 42 is hold between the surface member 41 and the base part protrusion 431 of the base part 43 in the direction X of travel.

As described above, each component of the tip part 40 according to the present embodiment is fixed by a relatively simple structure.

(Fourth embodiment) A flying body 1 according to the present embodiment can be obtained by coupling a tip part 50 according to the present embodiment to the body part 10 shown in FIG. 3A, instead of the tip part 20 of the flying body 1 shown in FIG. 3A. In the following, it will be mainly described about portions of the configuration of the tip part 50 according to the present embodiment that are different from the configuration of the tip part 20 according to the first embodiment.

Figure 14:
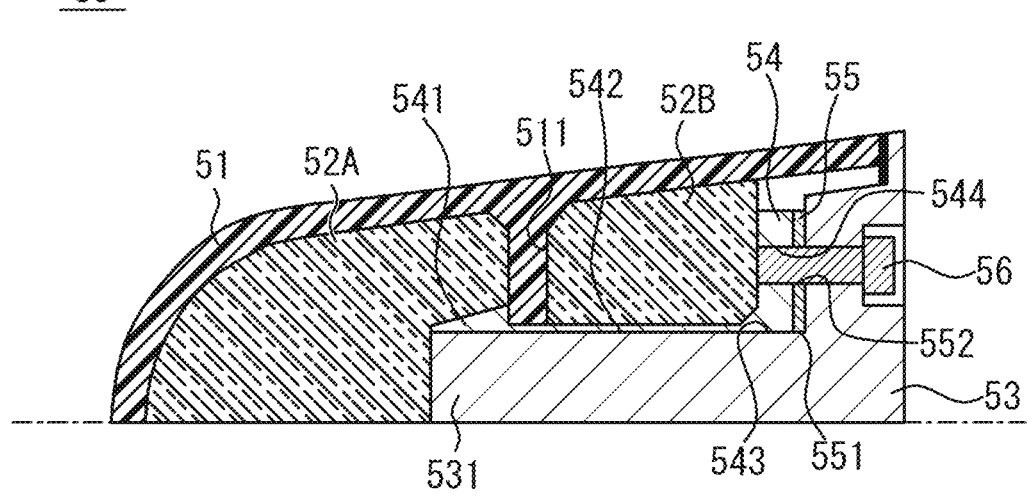
FIG. 14 is a partial cross-sectional view that shows a configuration example of the tip part according to an embodiment.

A configuration example of the tip part 50 according to an embodiment will be described with reference to FIG. 14 and FIG. 15. FIG. 14 is a partial cross-sectional view that shows a configuration example of the tip part 50 according to an embodiment. FIG. 15 is a partial cross-sectional view that shows a configuration example of the tip part 50 according to an embodiment.

As shown in FIG. 14, the tip part 50 according to the present embodiment is provided with a surface member 51 as a heat resistant material, insulation members 52A, 52B, and a base part 53, similarly to the tip part 20 according to the first embodiment shown in FIG. 3B and the like. Furthermore, the tip part 50 according to the present embodiment is provided with a comb teeth member 54 as a component corresponding to the abutting member 24 according to the first embodiment. In addition, the tip part 50 according to the present embodiment is provided with a bolt 56 as a component corresponding to the bolt 25 as a coupling member according to the first embodiment. The tip part 50 according to the present embodiment may be further provided with a shim 55 for adjusting a positional relationship of the surface member 51, the base part 53, and the comb teeth member 54 in the direction X of travel.

As shown in FIG. 14 and FIG. 15, the surface member 51 according to the present embodiment is provided with a surface member protrusion 511 that protrudes from a whole circumference of an inner surface of the surface member 51 to an inner space of the surface member 51. The surface member protrusion 511 is provided with an engaging hole 512. A first portion of the inner space of the surface member 51 in the front direction from the surface member protrusion 511 and a second portion in the back direction of the inner space are connected by the engaging hole 512 as a passage.

As shown in FIG. 14 and FIG. 15, the comb teeth member 54 is provided with a base arranged in the back direction from the surface member protrusion 511, a plurality of shafts 542 that extend from this base to the front direction in a comb-teeth-shape, and a plurality of barbs 541 respectively provided to each end of the plurality of shafts 542. These shafts 542 are penetrating through the engaging hole 512 of the surface member protrusion 511; and these barbs 541 are arranged in the front direction from the engaging hole 512 and protruded from the engaging hole 512 to outside. These barbs 541 are shaped to be engaged with the surface member protrusion 511 and not move in the back direction as long as these barbs 541 are arranged outside the engaging hole 512. In other words, each barb 541 is connected to the base via one of the shafts 542 and locked to the engaging hole 512.

As shown in FIG. 14 and FIG. 15, the base of the comb teeth member 54 is provided with a penetration hole 543 for the base part 53 to penetrate therethrough. The plurality of shafts 542 are arranged around the penetration hole 543. An inside surface of the penetration hole 543 is cylindrical and is continuous with a portion of a surface of each shaft 542. The base of the comb teeth member 54 is further provided with a bolt hole 544 for screwing a bolt 56 outside the penetration hole 543. The base of the comb teeth member 54 provided with the bolt hole 544 functions as a coupling member for coupling with the bolt 56 as a coupling member.

As shown in FIG. 14 and FIG. 15, the base part 53 is provided with a base part protrusion 531 that penetrates through the penetration hole 543 of the comb teeth member 54. The base part protrusion 531 is cylindrical; and by arranging the base part protrusion 531 so as to fill the inside of the penetration hole 543, the barbs 541 of the comb teeth member 54 is made unable from moving to inward from the engaging hole 512.

As shown in FIG. 14, the shim 55 is arranged between the comb teeth member 54 and the base part 53. The shim 55 is provided with a penetration hole 551 for the base part protrusion 531 to penetrate therethrough and a bolt penetration hole 552 for the bolt 56 to penetrate therethrough.

A manufacturing method of the tip part 50 according to an embodiment will be described with reference to FIG. 16A and FIG. 16B. Each of FIG. 16A and FIG. 16B is a disassembled perspective view that shows a configuration example of the tip part 50 according to an embodiment.

At first, a first space of the inner space of the surface member 51 in a front direction from the surface member protrusion 511 is filled with the insulating member 52A. At that time, the insulation member 52A passes through the engaging hole 512 of the surface member protrusion 511. Then, a second space of the inner space of the surface member 51 in a back direction from the surface member protrusion 511 is filled with the insulation member 52B. At that time, it is preferable to keep a space for arranging the shafts 542 and the barbs 541 of the comb teeth member 54 and the base part protrusion 531 of the base part 53.

Then, the comb teeth member 54 is installed to the surface member 51. At that time, the comb teeth member 54 is installed to the surface member 51 so that the barbs 541 of the comb teeth member 54 penetrates through the engaging hole 512 of the surface member protrusion 511 and is positioned in the front direction from the engaging hole 512.

Then, the shim 55 is temporarily fixed on a back direction surface of the comb teeth member 54 by use of an adhesive or the like. As a variation example, the shim 55 may be temporarily fixed on a front direction surface of the base part 53.

Then, the base part 53 is installed to a back direction edge of the surface member 51. At that time, the base part protrusion 531 of the base part 53 penetrates through the penetration hole 543 of the comb teeth member 54. In this state, the barbs 541 of the comb teeth member 54 becomes unable to move inward from the engaging hole 512. Therefore, the barbs 541 cannot be disconnected from the engaging hole 512 and the comb teeth member 54 becomes unable to move in the back direction.

Then, the bolt 56 is screwed to the bolt hole 544 of the comb teeth member 54. At that time, the bolt 56 penetrates through the bolt penetration hole 532 of the base part 53 and the bolt penetration hole 552 of the shim 55. As a result, the surface member 51, the comb teeth member 54, and the base part 53 are coupled. In addition, the insulation member 52 is held between the surface member 51 and the base part protrusion 531 of the base part 53 in the direction X of travel.

As described above, according to the present embodiment, no bolt hole and no bolt penetration hole need to be provided to the surface member 51 configured to include a layer of zirconium carbide 61.

Although the invention made by the inventors has been specifically described above based on the embodiments, it is needless to say that the present invention is not limited to the above-described embodiments and can be variously modified within a range of not departing from the gist thereof. In addition, each feature described in the above-described embodiments may be freely combined within a range of a technical consistence.

In each of the above embodiments, a heat resistant structure of a flying body 1, of which a surface member 21 is provided with layers of zirconium carbide and zirconium oxide on a surface thereof, has been described. As a variation example of each embodiment, a surface member 21 provided with layers of tantalum carbide (TaC) and tantalum pentoxide (Ta$_2$O$_5$) instead of zirconium carbide and zirconium oxide, may be used. The melting point of the tantalum carbide is 2985° C. and the melting point of the tantalum pentoxide is 1872° C. The heat resistant structure according to this variation example has a resistance to temperatures up to these melting points. In addition, as another variation example, a surface member 21 provided with layers of hafnium carbide (HfC) and hafnium oxide (HfO$_2$) instead of zirconium carbide and zirconium oxide, may be used. The melting point of the hafnium carbide is 3900° C. and the melting point of the hafnium oxide is 2758° C. The heat resistant structure according to this variation example has a resistance to temperatures lower than these melting points.

The heat resistant structure of the flying body 1 according to each embodiment is understood for example as below.

(1) A heat resistant structure of a flying body 1 according to a first aspect is provided with a tip part 20, 30, 40, 50 and a body part 10. The tip part 20, 30, 40, 50 is arranged at a front end of the flying body 1 with respect to a direction X of travel of the flying body 1. The body part 10 is arranged in a back direction from the tip part with respect to the direction of travel of the flying body 1. The tip part 20, 30, 40, 50 is provided with a surface member 21, 31, 41, 51, a base part 23, 33, 43, 53, and an insulation member 22, 32, 42, 52. The surface member 21, 31, 41, 51 is arranged on an outer surface of the tip part 20, 30, 40, 50 and has a melting point higher than a desired temperature. The base part 23, 33, 43, 53 couples the surface member 21, 31, 41, 51 to the body part 10. The insulation member 22, 32, 42, 52 is arranged between the surface member 21, 31, 41, 51 and the base part 23, 33, 43, 53 and thermally insulates the base part 23, 33, 43, 53 from the surface member 21, 31, 41, 51.

The heat resistant structure of the flying body 1 according to the first aspect has an effect of protecting the body part 10 of the flying body 1 from heat generated at the front end of the flying body 1 with respect to the direction of travel by a thermal insulation structure having a three-layer structure in which the surface member 21, 31, 41, 51 having a high melting point, the insulation member 22, 32, 42, 52, and the base part 23, 33, 43, 53 are laminated in this order.

(2) A heat resistant structure of a flying body 1 according to a second aspect is the heat resistant structure of the flying body 1 according to the first aspect; and the surface member 21, 31, 41,51 is provided with a heat resistant material including a zirconium alloy on at least an outer surface of a carbon fiber reinforced carbon composite material 6 that has a shape of the surface member 21, 31, 41, 51.

The heat resistant structure of the flying body 1 according to the second aspect has an effect of having an excellent heat resistance by arranging the heat resistant material having a very high melting point on the outer surface.

(3) A heat resistant structure of a flying body 1 according to a third aspect is the heat resistant structure of the flying body 1 according to the second aspect; and a density of the zirconium alloy in the heat resistant material decreases continuously from a front direction to a back direction with respect to the direction X of travel of the flying body 1.

The heat resistant structure of the flying body 1 according to the third aspect has an effect of effectively using a heat resistance performance of the heat resistant structure by arranging a part of the heat resistant material with a highest heat resistance performance at a front end of the flying body 1 that becomes the hottest when moving in the atmosphere. In addition, the heat resistant structure of the flying body 1 according to the third aspect has an effect of preventing the insulation material from being damaged by making the heat resistance performance of the heat resistant material change continuously to make a continuous distribution of a stress due to a temperature distribution in the heat resistant material.

(4) A heat resistant structure of a flying body 1 according to a fourth aspect is the heat resistant structure of the flying body 1 according to any one of the first to third aspects; and the surface member 21, 31, 41, 51 is provided with a surface member protrusion 211, 311, 411, 511 that protrudes from an inner surface of the surface member 21, 31, 41, 51 to an inner space of the surface member 21, 31, 41, 51. The tip part 20, 30, 40, 50 is further provided with an abutting member 24, 34, 35, 44, 54 and a coupling member 25, 36, 45, 56. At least a part of the abutting member 24, 35, 44, 54 is arranged in the front direction from the surface member protrusion 211, 311, 411, 511 with respect to the direction of travel of the flying body 1, and abuts on a front surface of the surface member protrusion 211, 311, 411, 511. The coupling member 25, 36, 45, 56 couples the abutting member 24, 34, 35, 44, 54 and the base part 23, 33, 43, 53. The base part 23, 33, 43, 53 is provided with a base part abutting surface that receives a reaction force from the surface member 21, 31, 41, 51 from the front direction.

The heat resistant structure of the flying body 1 according to the fourth aspect has an effect of receiving a reaction force from the surface member 21, 31, 41, 51 at the base part 23, 33, 43, 53 by coupling the surface member 21, 31, 41, 51 to the base part 23, 33, 43, 53.

(5) A heat resistant structure of a flying body 1 according to a fifth aspect is the heat resistant structure of the flying body 1 according to the fourth aspect; and the abutting member 24 is provided with a holding part 241 and an abutting member protrusion 242. The holding part 241 holds the insulation member 22 between the holding part 241 itself and the inner surface. The abutting member protrusion 242 protrudes from an outer surface of the abutting member 24 to outside, and abuts on the surface of the surface member protrusion 211 in the front direction. The coupling member 25 is provided with a bolt 25 that fastens the base part 23 to the abutting member 24.

The heat resistant structure of the flying body 1 according to the fifth aspect has an effect of reducing a volume of the insulation member 22 by coupling the surface member 21 and the abutting member 24, and holding the insulation member 22 between them.

(6) A heat resistant structure of a flying body 1 according to a sixth aspect is the heat resistant structure of the flying body 1 according to the fifth aspect; and the abutting member 24 is further provided with an abutting member concavity 243. The abutting member concavity 243 is arranged to be adjacent to the abutting member protrusion 242 in a circumferential direction R perpendicular to the direction of travel of the flying body 1, and has a shape so that the surface member protrusion 231 passes therethrough when the abutting member 24 moves into the inner space of the surface member 21 in the direction of travel of the flying body 1. The surface member 21 is further provided with a surface member concavity 212. The surface member concavity 212 is arranged to be adjacent to the surface member protrusion 211 in the circumferential direction R and has a shape so that the abutting member protrusion 242 passes therethrough when the abutting member 24 moves into the inner space of the surface member 21 in the direction of travel of the flying body 1. The base part 23 is provided with a circumferential direction restrainer 231. The circumferential direction restrainer 231 has a shape to be insertable from the back direction to the front direction so as to restrain the surface member 21 and the abutting member 24 from rotating in the circumferential direction by penetrating through the surface member concavity 212 and the abutting member concavity 243 in an overlapped state when the base part 23 moves in the direction X of travel of the flying body 1 to abut on the abutting member 24 in a state in which the abutting member protrusion 242 is arranged in the front direction from the surface member protrusion 211 with respect to the direction X of travel of the flying body 1.

The heat resistant structure of the flying body 1 according to the sixth aspect has an effect of restraining the surface member 21 and the abutting member 24 by the base part 23 not to rotate in the circumferential direction R with respect to each other.

(7) A heat resistant structure of a flying body 3 according to a seventh aspect is the heat resistant structure of the flying body 3 according to the fifth or the sixth aspect; and the tip part 20 is further provided with a gasket 261. The gasket 261 is arranged between the surface member 21 and the base part 23 to relieve a stress generated by a deformation of the surface member 21 due to heating.

The heat resistant structure of the flying body 1 according to the seventh aspect has an effect of relieving a stress generated by a deformation of the surface member 21 due to heating.

(8) A heat resistant structure of a flying body 3 according to an eighth aspect is the heat resistant structure of the flying body 1 according to the fifth or the sixth aspect; and the tip part 20 is further provided with a biasing device 262. The biasing device 262 biases the bolt 25, which penetrates through the base part 23 and is fastened to the abutting member 24, in the back direction, and relieves a stress generated by a deformation of the surface member 21 due to heating.

The heat resistant structure of the flying body 1 according to the eighth aspect has an effect of relieving a stress generated by a deformation of the surface member 21 due to heating.

(9) A heat resistant structure of a flying body 1 according to a ninth aspect is the heat resistant structure of the flying body 1 according to the fourth aspect; and the surface member 31 is further provided with a groove 313 and a surface member abutting part 314. The groove 313 is provided in the front direction from the surface member protrusion 311 so as to go around an inner wall surface 310 of the surface member 31 in a circumferential direction R perpendicular to the direction of travel of the flying body 1. The surface member abutting part 314 is provided in the front direction from the groove 313 and protrudes from the surface member protrusion 311 to the inner space. The abutting member 34, 35 is provided with a. C-shape retaining ring 35 and a fixing member 34. The C-shape retaining ring 35 is fit into the groove 313. The fixing member 34 is held between the C-shape retaining ring 35 and the surface member abutting part 314. The fixing member 34 is provided with a bolt part 341 extending in the back direction. The base part 33 is provided with a hole through which the bolt part 341 penetrates in a state in which the base part 33 is coupled to the abutting member 34, 35. The coupling member 36 is provided with a nut 36 that fastens the bolt part 341 to the base part.

The heat resistant structure of the flying body 1 according to the ninth aspect has an effect of coupling the surface member 31 and the fixing member 34 and maintaining a space to arrange the insulation member 32 between them.

(10) A heat resistant structure of a flying body 1 according to a tenth aspect is the heat resistant structure of the flying body 1 according to the fourth aspect; and the surface member protrusion 411 is provided with a passage 412 provided to fill the inner space of the surface member 41 with the insulation member 42 from outside. The coupling member 45 couples the base part 43 to the surface member 41 by penetrating through the surface member protrusion 411 and fastening the surface member protrusion 411 to the abutting member 44. The base pail 43 is provided with a base part protrusion 431 that blocks the passage 412 by fastening the base part 43 to the surface member 41.

The heat resistant structure of the flying body 1 according to the tenth aspect has an effect of being capable to fix each component by a relatively simple structure.

(11) A heat resistant structure of a flying body 1 according to an eleventh aspect is the heat resistant structure of the flying body 1 according to the fourth aspect; and the surface member protrusion 511 is provided with a passage 512 provided to fill the inner space of the surface member 51 with the insulation member 52A, 52B from outside. The abutting member 54 is provided with: a coupling member 544 that is to be coupled to the coupling member 56; a plurality of barbs 541 that are to be connected to the coupling member 544 and locked to the passage 512; a plurality of shafts 542 that are to respectively connect the plurality of barbs 541 to the coupling member 544; and a penetration hole 543 around which the plurality of shafts 542 are arranged. The base part 53 is provided with a base part protrusion 531 that penetrates through the penetration hole 543 to restrain the plurality of barbs 541 from being disconnected from the surface member protrusion 511 in a state in which the base part 53 is coupled to the abutting member 54.

The heat resistant structure of the flying body 1 according to the eleventh aspect has an effect in that no bolt hole and no bolt penetration hole are needed to be provided to the surface member 51.

The manufacturing method of the heat resistant structure of the flying body 1 according to each embodiment is understood for example as below.

(1) A manufacturing method of a heat resistant structure of a flying body 1 according to a first aspect includes: manufacturing a tip part 20, 30, 40, 50 that is to be arranged at a front end of the flying body 1 with respect to a direction X of travel of the flying body 1; manufacturing a body part 10 that is to be arranged in a back direction from the tip part 20, 30, 40, 50 with respect to the direction X of travel of the flying body 1; and manufacturing the flying body 1 by coupling the tip part 20, 30, 40, 50 and the body part 10. The manufacturing the tip part 20, 30, 40, 50 includes: manufacturing a surface member 21, 31, 41, 51 that is provided to cover a surface of the tip part 20, 30, 40, 50 and that has a melting point higher than a desired temperature; manufacturing a base part 23, 33, 43, 53 that couples the surface member 21, 31, 41, 51 to the body part 10; and arranging an insulation member 22, 32, 42, 52, that thermally insulates the base part 23, 33, 43, 53 from the surface member 21, 31, 41, 51, between the surface member 21, 31, 41, 51 and the base part 23, 33, 43, 53. The manufacturing the surface member 21, 31, 41, 51 includes: immersing a carbon fiber reinforced carbon composite material 6 that has a shape of the surface member 21, 31, 41, 51 in a molten zirconium so that zirconium is impregnated on at least an outer surface of the carbon fiber reinforced carbon composite material 6 and that a carbon of the carbon fiber reinforced carbon composite material as a base material and the zirconium react into a zirconium alloy; and withdrawing the carbon fiber reinforced carbon composite material 6 from the molten zirconium and cooling the carbon fiber reinforced carbon composite material 6.

The manufacturing method of the heat resistant structure of the flying body 1 according to the first aspect has an effect of protecting the body part 10 of the flying body 1 from the heat generated in the front end of the flying body 1 with respect to the direction of travel, by manufacturing a heat resistant structure with a three-layer structure in which the surface member 21, 31, 41, 51 having a high melting point, the insulating member 22, 32, 42, 52, and the base part 23, 33, 43, 53 are laminated in this order. In addition, the manufacturing method of the heat resistant structure of the flying body 1 according to the first aspect has an effect of having an excellent heat resistance by arranging a heat resistant material having a very high melting point on the outer surface.

(2) A manufacturing method of a heat resistant structure of a flying body 1 according to a second aspect is the manufacturing method of the heat resistant structure of the flying body 1 according to the first aspect; and the manufacturing the surface member further includes: immersing a carbon fiber reinforced carbon composite material in the molten zirconium from a first portion corresponding to a front edge with respect to a direction X of travel of the flying body 1 first and withdrawing the carbon fiber reinforced carbon composite material from the molten zirconium from a second portion corresponding to a back edge with respect to a direction X of travel of the flying body 1 first so that a density of the zirconium alloy in the carbon fiber reinforced carbon composite material decreases continuously from a front direction to a back direction with respect to the direction X of travel of the flying body 1.

The manufacturing method of the heat resistant structure of the flying body 1 according to the second aspect has an effect of effectively using the heat resistant performance of the heat resistant structure by manufacturing to arrange a part of the heat resistant material with a highest heat resistant performance at the front end of the flying body 1 that becomes the hottest when moving in the atmosphere. In addition, the manufacturing method of the heat resistant structure of the flying body 1 according to the second aspect has an effect of preventing the insulation material from being damaged by manufacturing to make the heat resistance performance of the heat resistant material change continuously to make a continuous distribution of a stress due to a temperature distribution in the heat resistant material.

What is claimed is:

1. A heat resistant structure of a flying body, applied to a flying body comprising:
    a tip part arranged at a front end of the flying body with respect to a direction of travel of the flying body; and
    a body part arranged in a back direction from the tip part with respect to the direction of travel of the flying body,
    wherein the tip part comprises:
        a surface member arranged on an outer surface of the tip part, the surface member having a melting point higher than a maximal temperature reached on a surface of the flying body when the flying body moves in an atmosphere and is heated;
        a base part configured to couple the surface member to the body part; and
        an insulation member arranged between the surface member and the base part, the insulation member configured to thermally insulate the base part from the surface member,
    wherein the surface member comprises a heat resistant material including a zirconium carbide, a tantalum carbide or a hafnium carbide on at least an outer surface of a carbon fiber reinforced carbon composite material that has a shape of the surface member, and
    wherein a density of the zirconium carbide, the tantalum carbide or the hafnium carbide in the heat resistant material decreases continuously from a front direction to a back direction with respect to the direction of travel of the flying body.

2. A heat resistant structure, applied to a flying body comprising:
    a tip part arranged at a front end of the flying body with respect to a direction of travel of the flying body; and
    a body part arranged in a back direction from the tip part with respect to the direction of travel of the flying body,
    wherein the tip part comprises:
        a surface member arranged on an outer surface of the tip part, the surface member having a melting point higher than a maximal temperature reached on a surface of the flying body when the flying body moves in an atmosphere and is heated;
        a base part configured to couple the surface member to the body part; and
        an insulation member arranged between the surface member and the base part, the insulation member configured to thermally insulate the base part from the surface member,
    wherein the surface member comprises a surface member protrusion that protrudes from an inner surface of the surface member to an inner space of the surface member,
    wherein the tip part further comprises:

an abutting member of which at least a part is arranged in a front direction from the surface member protrusion with respect to the direction of travel of the flying body, the abutting member being configured to abut on a front surface of the surface member protrusion; and
        a coupling member configured to couple the abutting member and the base part, and
    wherein the base part comprises a base part abutting surface configured to receive a reaction force from the surface member from the front direction.

3. The heat resistant structure, applied to the flying body according to claim 2,
    wherein the abutting member comprises:
        a holding part configured to hold the insulation member between the holding part and the inner surface; and
        an abutting member protrusion that protrudes from an outer surface of the abutting member to outside the abutting member, the abutting member protrusion configured to abut on the surface of the surface member protrusion in the front direction, and
    wherein the coupling member comprises a bolt configured to fasten the base part to the abutting member.

4. The heat resistant structure, applied to the flying body according to claim 3,
    wherein the abutting member further comprises an abutting member concavity arranged adjacent to the abutting member protrusion in a circumferential direction perpendicular to the direction of travel of the flying body, the abutting member concavity having a shape so that the surface member protrusion passes therethrough when the abutting member moves into the inner space of the surface member in the direction of travel of the flying body,
    wherein the surface member further comprises a surface member concavity arranged adjacent to the surface member protrusion in the circumferential direction, the surface member concavity having a shape so that the abutting member protrusion passes therethrough when the abutting member moves into the inner space of the surface member in the direction of travel of the flying body, and
    wherein the base part comprises a circumferential direction restrainer having a shape to be insertable from the back direction to the front direction so as to restrain the surface member and the abutting member from rotating in the circumferential direction by penetrating through the surface member concavity and the abutting member concavity in an overlapped state when the base part moves in the direction of travel of the flying body to abut on the abutting member in a state in which the abutting member protrusion is arranged in the front direction from the surface member protrusion with respect to the direction of travel of the flying body.

5. The heat resistant structure, applied to the flying body according to claim 3,
    wherein the tip part further comprises a gasket arranged between the surface member and the base part to relieve a stress generated by a deformation of the surface member due to heating.

6. The heat resistant structure, applied to the flying body according to claim 3,
    wherein the tip part further comprises a biasing device configured to bias the bolt, which penetrates through the base part and is fastened to the abutting member, in the back direction, and relieve a stress generated by a deformation of the surface member due to heating.

7. The heat resistant structure, applied to the flying body according to claim 2, wherein the surface member further comprises:

a groove provided in the front direction from the surface member protrusion so as to go around an inner wall surface of the surface member in a circumferential direction perpendicular to the direction of travel of the flying body; and a surface member abutting part provided in the front direction from the groove, and protruding from the surface member protrusion to the inner space, wherein the abutting member comprises:

a C-shape retaining ring fit into the groove; and a fixing member held between the C-shape retaining ring and the surface member abutting part, wherein the fixing member comprises a bolt part extending in the back direction, wherein the base part comprises a hole through which the bolt part penetrates in a state in which the base part is coupled to the abutting member, and wherein the coupling member comprises a nut configured to fasten the bolt part to the base part.

8. The heat resistant structure, applied to the flying body according to claim 2, wherein the surface member protrusion comprises a passage provided to fill the inner space of the surface member with the insulation member from outside, wherein the coupling member is configured to couple the base part to the surface member by penetrating through the surface member protrusion and fastening the surface member protrusion to the abutting member, and wherein the base part comprises a base part protrusion configured to block the passage by fastening the base part to the surface member.

9. The heat resistant structure, applied to the flying body according to claim 2, wherein the surface member protrusion comprises a passage provided to fill the inner space of the surface member with the insulation member from outside, wherein the abutting member comprises:

a coupling part configured to be coupled to the coupling member;

a plurality of barbs configured to be connected to the coupling part and locked to the passage;

a plurality of shafts configured to respectively connect the plurality of barbs to the coupling member; and a penetration hole around which the plurality of shafts are arranged, and wherein the base part comprises a base part protrusion configured to penetrate through the penetration hole to restrain the plurality of barbs from being disconnected from the surface member protrusion in a state in which the base part is coupled to the abutting member.

\* \* \* \* \*